United States Patent
Kunz et al.

(10) Patent No.: US 11,074,660 B1
(45) Date of Patent: Jul. 27, 2021

(54) SYSTEMS AND METHODS FOR FINANCIAL PLANNING BASED UPON CASH POSITIONS

(71) Applicant: The PNC Financial Services Group, Inc., Pittsburgh, PA (US)

(72) Inventors: Thomas Kunz, Pittsburgh, PA (US); Michael Golden, Pittsburgh, PA (US); Michael Kirch, Venetia, PA (US); Darcel Steber, Erie, PA (US); Janet Hoyt, McMurray, PA (US); Peter Bird, Pittsburgh, PA (US); Francisca Barros, Brookline, MA (US); Daniel DeRuntz, Somerville, MA (US); Islam Elsedoudi, Cambridge, MA (US); Anna Engström, Brookline, MA (US); Michelle Kwasny, Cambridge, MA (US); Scott Mackie, Somerville, MA (US); Stacey McCullough, Arlington, MA (US); Pierre-Alexandre Poirier, Boston, MA (US); Todd Vanderlin, Cambridge, MA (US); Colin Raney, Lexington, MA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 0 days.

(21) Appl. No.: 14/098,814

(22) Filed: Dec. 6, 2013

Related U.S. Application Data

(60) Provisional application No. 61/734,154, filed on Dec. 6, 2012, provisional application No. 61/734,132, filed
(Continued)

(51) Int. Cl.
*G06Q 40/00* (2012.01)

(52) U.S. Cl.
CPC .................................. *G06Q 40/12* (2013.12)

(58) Field of Classification Search
CPC ........ G06Q 40/02; G06Q 40/06; G06Q 40/12; G06F 3/04847
(Continued)

(56) References Cited

U.S. PATENT DOCUMENTS

| 5,619,631 A * | 4/1997 | Schott | ................... G06F 3/0481 345/440 |
| 7,050,997 B1 * | 5/2006 | Wood, Jr. | ............... G06Q 40/06 705/36 R |

(Continued)

*Primary Examiner* — Florian N Zeender
*Assistant Examiner* — Milena Racic
(74) *Attorney, Agent, or Firm* — Buchanan Ingersoll & Rooney PC

(57) ABSTRACT

Systems and methods are disclosed for financial planning based on actual cash positions for financial accounts associated with an entity and planned cash out and cash in amounts for the entity. In an embodiment, a system comprises a processor configured to render an interactive graphical user interface ("GUI") on a display device. The GUI has a plurality of selectable, actionable user interface elements such as tabs. In an embodiment, the GUI comprises a first tab selectable to display actual and planned net amount information of a cash position and actual and planned net amount graphs, the net amount information being cash out amounts subtracted from cash in amounts. The GUI comprises a second tab operable to display actual and planned cash in amount information and actual and cash in amount graphs. In an embodiment, the GUI comprises a third tab operable to display actual and planned cash out amount information and actual and planned cash out amount graphs.

23 Claims, 17 Drawing Sheets

Related U.S. Application Data on Dec. 6, 2012, provisional application No. 61/734,101, filed on Dec. 6, 2012, provisional application No. 61/734,174, filed on Dec. 6, 2012, provisional application No. 61/734,196, filed on Dec. 6, 2012.

(58) Field of Classification Search
USPC .......................................................... 705/30
See application file for complete search history.

(56) References Cited

U.S. PATENT DOCUMENTS

| | | | | |
|---|---|---|---|---|
| 7,392,212 | B2* | 6/2008 | Hancock | G06Q 40/00 |
| | | | | 705/35 |
| 7,555,451 | B2* | 6/2009 | Rugge | G06Q 10/10 |
| | | | | 705/35 |
| 8,306,885 | B2* | 11/2012 | Brose | G06Q 40/00 |
| | | | | 705/35 |
| 8,706,599 | B1* | 4/2014 | Koenig | G06Q 40/06 |
| | | | | 705/35 |
| 10,402,910 | B1* | 9/2019 | Kunz | G06Q 40/12 |
| 2006/0047588 | A1* | 3/2006 | Lal | G06Q 40/02 |
| | | | | 705/30 |
| 2011/0087985 | A1* | 4/2011 | Buchanan | G06F 3/04847 |
| | | | | 715/771 |
| 2013/0103580 | A1* | 4/2013 | Ventura | 705/40 |
| 2014/0222669 | A1* | 8/2014 | Novak | G06Q 40/128 |
| | | | | 705/40 |
| 2014/0324509 | A1* | 10/2014 | Anderson | G06Q 10/06375 |
| | | | | 705/7.23 |
| 2015/0149333 | A1* | 5/2015 | Yaplee | G06Q 40/12 |
| | | | | 705/30 |

* cited by examiner

US 11,074,660 B1

SYSTEMS AND METHODS FOR FINANCIAL PLANNING BASED UPON CASH POSITIONS

CROSS-REFERENCE TO RELATED APPLICATIONS

This patent application claims the benefit of, and priority to, U.S. Provisional Patent Application Nos. 61/734,154; 61/734,132; 61/734,101; 61/734,174; and 61/734,196, which are all incorporated herein by reference in their entireties.

The present application is related to concurrently-filed U.S. patent application Ser. No. 14/098,736, entitled "SYSTEMS AND METHODS FOR PROJECTING AND MANAGING CASH FLOW FOR FINANCIAL ACCOUNTS"; concurrently-filed U.S. patent application Ser. No. 14/098,698, to be determined, entitled "SYSTEMS AND METHODS FOR PROJECTING AND MANAGING CASH-IN FLOW FOR FINANCIAL ACCOUNTS"; concurrently-filed U.S. patent application Ser. No. 14/098,844, to be determined, entitled "SYSTEMS AND METHODS FOR PROJECTING AND MANAGING CASH-OUT FLOW FOR FINANCIAL ACCOUNTS"; and concurrently-filed U.S. patent application Ser. No. 14/098,873, entitled "SYSTEMS AND METHODS FOR CREATING AND MANAGING FINANCIAL ACCOUNTS", which are all incorporated herein by reference in their entireties.

FIELD OF THE INVENTION

The present disclosure is generally directed toward a system for network-type banking. More particularly, the present disclosure is directed toward systems, methods, and user interfaces for financial planning based upon cash positions in accounts associated with entities such as businesses and organizations using in part an online banking system or network as a part thereof.

BACKGROUND OF THE INVENTION

Banks and other financial institutions have expanded the banking services they provide to their customers and clients from the traditional banking operations, where transactions are effectuated in person at a banking institution's physical location, to Internet or online banking, where customers effectuate transactions via a communications network, such as the Internet. A major benefit customers enjoy with online banking is convenience, because more often than not customers can easily complete multiple tasks, even without leaving their homes to visit the local branch of their banking institution. Efficiency and convenience are what set online banking apart from traditional banking.

With online banking, customers are able to pay their bills, move, deposit, or withdraw money to another account, reconcile multiple bank accounts, and enjoy related services designed to expedite their bank transactions, even when they are just at home. In a matter of seconds, bank transactions can be completed and the customer can even print his or her receipts for recording purposes. With online banking, various transactions are more efficient and it also saves the valuable time of customers which they can use to do other tasks. Online banking allows customers to enjoy unlimited access to his or her bank account, no matter what the time of day, including holidays and weekends. In addition, accounts can be accessed even if the customer is in another country, as long as there is an Internet connection.

Despite this, most online banking structures are directed towards individual users and not with an eye towards businesses and business owners. This is even more apparent in the context of small businesses and small business owners. Typical online banking interfaces lack a way for a business owner to visualize current monetary positions in a simple fashion that can be readily and easily understood by an individual with a primary background in the area of business administration and similar fields. Furthermore, present online banking interfaces lack a way for a business owner to predict monetary positions based on past, current, and future incoming and outgoing monetary transactions in an easily understood fashion.

The present disclosure is directed toward overcoming one or more of the above-identified problems.

SUMMARY OF THE INVENTION

Systems and methods for financial planning based on actual cash positions is disclosed herein. A system for financial planning based on an actual cash position is disclosed herein that comprises a processor and a non-transitory computer-readable medium that has instructions stored thereon, that, if executed by the processor, cause the processor to render a graphical user interface ("GUI") on a display. The GUI comprises a plurality of selectable user interface ("UI") elements. The instructions comprise instructions for displaying at least one of net amount information of the actual cash position and a net amount graph in response to receiving a selection of a first UI element of the plurality of selectable UI elements. The net amount information is actual cash out amount information, which includes all outgoing cash transactions, for an entity subtracted from actual cash in amount information, which includes all incoming cash transactions, for the entity. Outgoing cash transactions includes all payable transactions. In addition, incoming cash transactions includes all receivable transactions.

Further, the instructions comprise instructions for displaying at least one of the actual cash in amount information and an actual cash in amount graph in response to receiving a selection of a second UI element of the plurality of selectable UI elements and instructions for displaying at least one of the actual cash out amount information and an actual cash out amount graph in response to receiving a selection of a third UI element of the plurality of selectable UI elements.

In addition, at least one of the first UI element and a fourth UI element is operable to display at least one of planned net amount information and a planned net amount graph, at least one of the second UI element and a fifth UI element is operable to display at least one of planned cash in amount information and a planned cash in amount graph, and at least one of the third UI element and a sixth UI element is operable to display at least one of planned cash out amount information and a planned cash out amount graph. The planned net amount information is planned cash out amount information subtracted from planned cash in amount information.

In a further embodiment of the system, the actual cash position is an actual cash position of an entity and the net amount information is based on a current time value. In addition, the instructions further comprise instructions for displaying historical net amount information and a historical net amount graph. The historical net amount information is based on a historical time value.

In still a further embodiment of the system, the current time value is a current year and the historical time value is a year prior to the current year.

In yet a further embodiment of the system, the GUI is configured to accept a selection of future net amount information based on a future time value and the instructions further comprise instructions for displaying the future net amount information and a future net amount graph in response to receiving the selection of the future net amount information.

In another embodiment of the system, the current time value is a current year and the future time value is a year succeeding the current year.

In still another embodiment of the system, the GUI comprises a best and worst case net amount scenario and the best and worst case net amount scenario is based on the historical net amount information.

In yet another embodiment of the system, the instructions further comprise instructions for retrieving the net amount information, the actual cash in amount information, and the actual cash out amount information from an account provided by a host institution.

In a further embodiment, the host institution is a bank and the processor is controlled by the bank.

In still a further embodiment of the system, the second UI element is a second tab and the third UI element is a third tab and the instructions further comprise instructions for displaying at least one of historical cash in amount information based on a historical time value and a historical cash in amount graph and instructions for displaying at least one of historical cash out amount information based on the historical time value and a historical cash out amount graph.

In yet a further embodiment of the system, the planned net amount information and the planned net amount graph are adjustable based on inputs received from a user and the instructions further comprise instructions for updating the planned net amount information and displaying an updated planned net amount graph in response to receiving adjustments to at least one of the planned net amount information and the planned net amount graph.

In another embodiment of the system, the planned cash in amount information and the planned cash in amount graph are adjustable based on inputs received from a user, the instructions further comprise instructions for updating the planned cash in amount information and displaying an updated planned cash in amount graph in response to receiving adjustments to at least one of the planned cash in amount information and the planned cash in amount graph.

In still another embodiment of the system, the planned cash out amount information and the planned cash out amount graph are adjustable based on inputs received from a user and the instructions further comprise instructions for updating the planned cash out amount information and displaying an updated planned cash out amount graph in response to receiving adjustments to at least one of the planned cash out amount graph cause and the planned cash out amount information.

In yet another embodiment of the system, the plurality of UI elements of the GUI comprises a planner toggle and the instructions further comprise instructions for displaying the planned net amount graph if the planner toggle is selected and instructions for foregoing displaying the planned net amount graph if the planner toggle is not selected.

In a further embodiment of the system, the GUI comprises a selectable cash in UI element and a selectable cash out UI element and the instructions further comprise instructions for updating the planned cash in amount information and displaying the updated planned cash in amount graph in response to receiving at least one of a selection of the selectable cash in UI element, adjustments to the planned net amount information, and adjustments to the planned cash in amount graph. Further, the instructions comprise instructions for updating the planned cash out amount information and displaying the updated planned cash out amount graph in response to receiving at least one of a selection of the selectable cash out UI element, adjustments to the planned net amount information, and adjustments to the planned cash out amount graph.

In still a further embodiment of the system, the instructions further comprise instructions for displaying a pop up box at a point on the net amount graph or the planned net amount graph in response to user interaction with the GUI.

Also disclosed herein is a non-transitory computer readable medium that has instructions stored thereon that, if executed by a computing device, cause the computing device to perform operations for providing a tool for financial planning based on an actual cash position of an entity. The operations comprise rendering a graphical user interface having a plurality of selectable user interface ("UI") elements, displaying at least one of a net amount of the actual cash position and a net amount graph in response to detecting a selection of a first UI element of the plurality of UI elements, displaying at least one of the actual cash in amount and an actual cash in amount graph in response to detecting a selection of a second UI element of the plurality of UI elements, displaying at least one of the actual cash out amount and an actual cash out amount graph in response to detecting a selection of a third UI element of the plurality of UI elements. The net amount of the actual cash position being an actual cash in amount subtracted by an actual cash out amount.

In addition, at least one of the first UI element and a fourth UI element is operable to display at least one of a planned net amount and a planned net amount graph, at least one of the second UI element and a fifth UI element is operable to display a planned cash in amount and a planned cash in amount graph, and at least one of the third UI element and a sixth UI element is operable to display at least one of a planned cash out amount and a planned cash out amount graph.

Further disclosed herein is a method for financial planning based on an actual cash position that comprises rendering a graphical user interface ("GUI") for a financial planning tool and presenting, in the GUI, at least one of net amount information of the actual cash position and a net amount graph in response to receiving a selection of a first UI element of the plurality of selectable UI elements. The GUI comprises a plurality of selectable user interface ("UI") elements and the net amount information being actual cash out amount information for an entity subtracted from actual cash in amount information for the entity.

The method further requires displaying at least one of the actual cash in amount information and an actual cash in amount graph in response to receiving a selection of a second UI element of the plurality of selectable UI elements, displaying at least one of the actual cash out amount information and an actual cash out amount graph in response to receiving a selection of a third UI element of the plurality of selectable UI elements.

In addition, at least one of the first UI element and a fourth UI element is operable to display at least one of planned net amount information and a planned net amount graph, at least one of the second UI element and a fifth UI element is operable to display at least one of planned cash in amount information and a planned cash in amount graph, and at least one of the third UI element and a sixth UI element is operable to display planned cash out amount information and a planned cash out amount graph. The planned net amount information is planned cash out amount information subtracted from planned cash in amount information.

In a further embodiment of the method, the actual cash position is an actual cash position of the entity and the plurality of selectable UI elements comprise a plurality of tabs.

In still a further embodiment of the method, the net amount information is based on a current time value and the method further comprises displaying at least one of historical net amount information and a historical net amount graph. The historical net amount information is based on a historical time value.

In another embodiment of the method, the method further comprises displaying at least one of historical cash in amount information based on a historical time value and a historical cash in amount graph and displaying at least one of historical cash out amount information based on the historical time value and a historical cash out amount graph.

Also disclosed herein is a system that includes a processor configured to provide a graphical user interface having a plurality of selectable user interface ("UI") elements, such as tabs. According to an embodiment of the system, a first tab of the plurality of selectable tabs operable to display net amount information of the actual cash position and a net amount graph, a second tab of the plurality of selectable tabs operable to display the actual cash in amount information and an actual cash in amount graph, and a third tab of the plurality of selectable tabs operable to display the actual cash out amount information and an actual cash out amount graph. The net amount information of the actual cash position is actual cash in amount information subtracted by actual cash out amount information.

Further, the first tab is operable to display planned net amount information and a planned net amount graph, the second tab is operable to display planned cash in amount information and a planned cash in amount graph, and the third tab is operable to display planned cash out amount information and a planned cash out amount graph. The planned net amount information is the planned cash in amount information subtracted by the planned cash out amount information.

In another embodiment, the system requires that the net amount information is based on a current time value and the first tab is operable to display historical net amount information a historical net amount graph. The historical net amount information is based on a historical time value.

In yet another embodiment, the system requires that the current time value is a current year and the historical time value is a year prior to the current year.

In a further embodiment the system requires that the first tab comprises a selection for future net amount information based on a future time value and that the first tab is operable to display the future net amount information and a future net amount graph.

In still a further embodiment, the system requires that the current time value is a current year and the future time value is a year succeeding the current year.

In another embodiment the system requires that the first tab comprises a best and worst case net amount scenario and that the best and worst case net amount scenario is based on the historical net amount information.

In another embodiment, the system requires that the net amount information, the actual cash in amount information, and the actual cash out amount information are retrieved from an account provided by a host institution.

In yet another embodiment, the system requires that the host institution is a bank and the processor is controlled by the bank.

In a further embodiment, the system requires that the second tab is operable to display historical cash in amount information based on a historical time value and a historical cash in amount graph, and the third tab is operable to display historical cash out amount information based on the historical time value and a historical cash out amount graph.

In still a further embodiment, the system requires that the planned net amount information and the planned net amount graph are adjustable by a user and adjustments made to the planned net amount information cause corresponding changes to be made to the planned net amount graph. Further, changes made to the planned net amount graph cause corresponding changes to be made to the planned net amount information.

In another embodiment, the system requires that the planned cash in amount information and the planned cash in amount graph are adjustable by a user and wherein adjustments made to the planned cash in amount information cause corresponding changes to be made to the planned cash in amount graph. Further, changes made to the planned cash in amount graph cause corresponding changes to be made to the planned cash in amount information.

In another embodiment, the system requires that the planned cash out amount information and the planned cash out amount graph are adjustable by a user and wherein adjustments made to the planned cash out amount information cause corresponding changes to be made to the planned cash out amount graph. Further, changes made to the planned cash out amount graph cause corresponding changes to be made to the planned cash out amount information.

In yet another embodiment, the system requires that the graphical user interface comprises a planner toggle. If the planner toggle is not selected, the planned net amount graph is not displayed and if the planner toggle is selected, the planned net amount graph is displayed.

In a further embodiment, the system requires that the first tab comprises a plan affects selection and the plan affects selection comprises a cash in selection and a cash out selection. If the cash in selection is marked, modifications made to the planned net amount information or the planned net amount graph cause corresponding changes to be made to the planned cash in amount information and the planned cash out amount graph and if the cash out selection is marked, modifications made to the planned net amount information or the planned net amount graph cause corresponding changes to be made to the planned cash out amount information and the planned cash out amount graph.

In still a further embodiment, the system requires that the first tab is operable to display a pop up box at a point on the net amount graph or the planned net amount graph based on an interaction of a user.

The presently disclosed exemplary technical solutions also may be embodied as methods, apparatuses, systems and computer readable media comprising a planner tool with an interactive graphical user interface comprising a plurality of selectable UI elements and user-adjustable graphs.

Further disclosed herein is a computer program embodied on a computer-readable storage medium which, if executed by a computing device or processor, provides financial planning based on an actual cash position of an entity. The computer program generally includes code or instructions for providing a graphical user interface having a plurality of selectable tabs screens. A first tab of the plurality of tabs operable to display a net amount of the actual cash position and a net amount graph, a second tab of the plurality of tabs operable to display the actual cash in amount and an actual cash in amount graph, and a third tab of the plurality of tabs operable to display the actual cash out amount and an actual cash out amount graph. The net amount of the actual cash is an actual cash in amount subtracted by an actual cash out amount.

In addition, the first tab is operable to display a planned net amount and a planned net amount graph, the second tab is operable to display a planned cash in amount and a planned cash in amount graph, and the third tab is operable to display a planned cash out amount and a planned cash out amount graph. Various other objects, aspects and advantages of the present disclosure can be obtained from a study of the specification, the drawings, and the appended claims.

BRIEF DESCRIPTION OF THE DRAWINGS

The presently disclosed exemplary technical solutions are best understood from the following detailed description when read in connection with the accompanying drawings, to which the claimed invention is not limited. According to common practice, various features/elements of the drawings may not be drawn to scale. Common numerical references represent like features/elements. The following figures are included in the drawings:

DETAILED DESCRIPTION OF THE INVENTION

Figure 1:
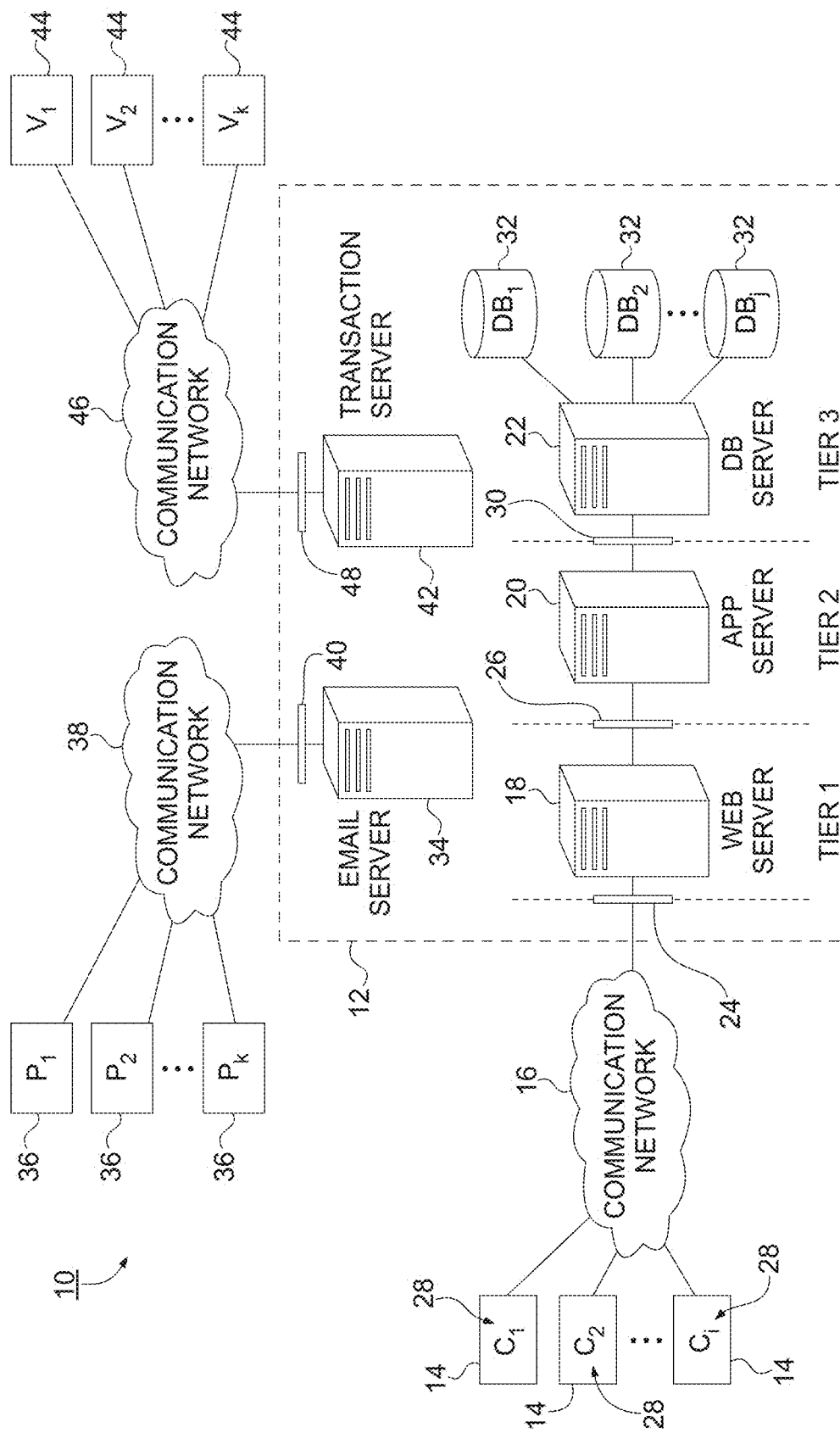
FIG. 1 illustrates a network architecture for various embodiments of the present disclosure.

As used herein, the terms entity, organization, and business can be used interchangeably and can include any entity or group associated with one or more financial accounts. In certain exemplary embodiments, entity, business and organization may be interchangeable used herein to identify a company, a corporation, a sole proprietorship, an association, a non-profit organization, a charitable organization, a learning institution such as a university or school, a hospital, a chamber of commerce, a government agency or organization at the federal, state, or local level, a professional services firm, a partnership, a foundation, a political action committee (PAC), or another entity associated with or having one or more financial accounts.

Further, as used herein, the terms "financial accounts" and "accounts" can be used interchangeably and can include any financial account associated with an entity, its owner(s), its financial manager(s), or its creditor(s). Unless specifically stated differently or from context, in exemplary embodiments, financial accounts may be interchangeably used herein to identify payroll accounts, merchant accounts, credit card accounts, sweep accounts, lines of credit for the entity, personal lines of credit for the entity's owner(s), and personal savings, checking, overdraft, or home equity accounts of the entity's owner(s).

Further, as used herein, the terms "business owner", "user", "customer", "proprietor", "manager", and "bookkeeper" can be used interchangeably and can include any user that performs financial planning on behalf of an entity. Unless specifically stated differently or from context, in exemplary embodiments, a user may be interchangeably used herein to identify a human user associated with an entity, such as a business owner, accountant, manager, or bookkeeper, or other person responsible for financial planning for the entity; a software application, or a group of users and/or software applications executed by one or more users to perform financial planning for the entity. Besides a natural person who can perform financial planning based on a cash position of an entity using an online banking user identification (user ID), a software application can be used to perform financial planning tasks. Accordingly, unless specifically stated, the terms "business owner", "user", "customer", "proprietor", "manager" and "bookkeeper" as used herein do not necessarily pertain to a human being.

Further, as used herein, in certain embodiments, the term "vendors" can refer to natural persons or entities who are suppliers, payees, or creditors of a paying entity (i.e., the payor). In embodiments, vendors can be a person or entity a user may have, or desires to have, a financial relationship with. Such parties may include, but are not limited to, billing entities for cash out transactions, such as outgoing transactions and expenses for accounts payable of the paying entity. For example, vendors can include, but are not limited to, utility companies, suppliers, mortgage companies, property management firms, landlords/lessors, credit card issuers, lenders, creditors, government agencies (in cases like taxes, fees, or fines) insurers/insurance agents (in the case of insurance premiums), and other parties with an existing financial relationship with the user's entity whereby the entity makes outgoing payments to the vendor.

Also, as used herein, in certain embodiments, the term "party" can refer to a natural person or entity who is a payor for a cash in transaction, such as an accounts receivable transaction for a receiving, payee entity. By way of example and not limitation, a party may be an existing or new customer of the payee, a merchant account (i.e., a credit card account the payee entity has established for receiving credit card payments), an investor, a business partner, a government agency (in cases of tax refunds, credits, or incentives) an insurance company/agent (in cases of payable claims, premium rebates, or premium refunds) or other parties having a financial relationship with the payee entity whereby the payee receives incoming payments or transfers from the parties to a financial account associated with the payee. For example, a party can be a financial advisor making a payment to a brokerage account associated with a payee entity for stock dividends and/or proceeds from the sale of securities.

The term "host institution" is used herein to identify for example, a financial institution (e.g., a bank or credit union an entity has an account with), a credit card issuer, a merchant account issuer (e.g., for a merchant's incoming credit card payments), a stand-in processor configured to act on-behalf of a card issuer or account issuer, or any other suitable institution configured to process financial transactions for an entity's financial accounts.

As used herein, the terms "entity", "organization", and "business" can be used interchangeably and can include any entity or group associated with one or more financial accounts. In certain exemplary embodiments, entity, business and organization may be interchangeable used herein to identify In certain exemplary embodiments, "Cash in" is used herein to identify all incoming cash flow for an account associated with an entity, including receivables or transfers from other accounts.

In exemplary embodiments, "Cash out" is used herein to identify all outgoing cash flow for an account associated with an entity, including payables or transfers to other accounts.

According to embodiments, the term "Net Amount" is used herein to identify the net cash position taking in account cash in amounts subtracted by cash out amounts.

In addition, the term "Posted Balance" or "Ledger Balance" means bank balance taking into account posted transactions.

The term "Available Balance" means bank balance taking into account posted transactions as of the most recent close of business.

And the term "Pending Balance" means the Posted Balance with any cash in amounts or cash out amounts that are pending for the entire working day.

Example Network and System Implementations

Figure 2:
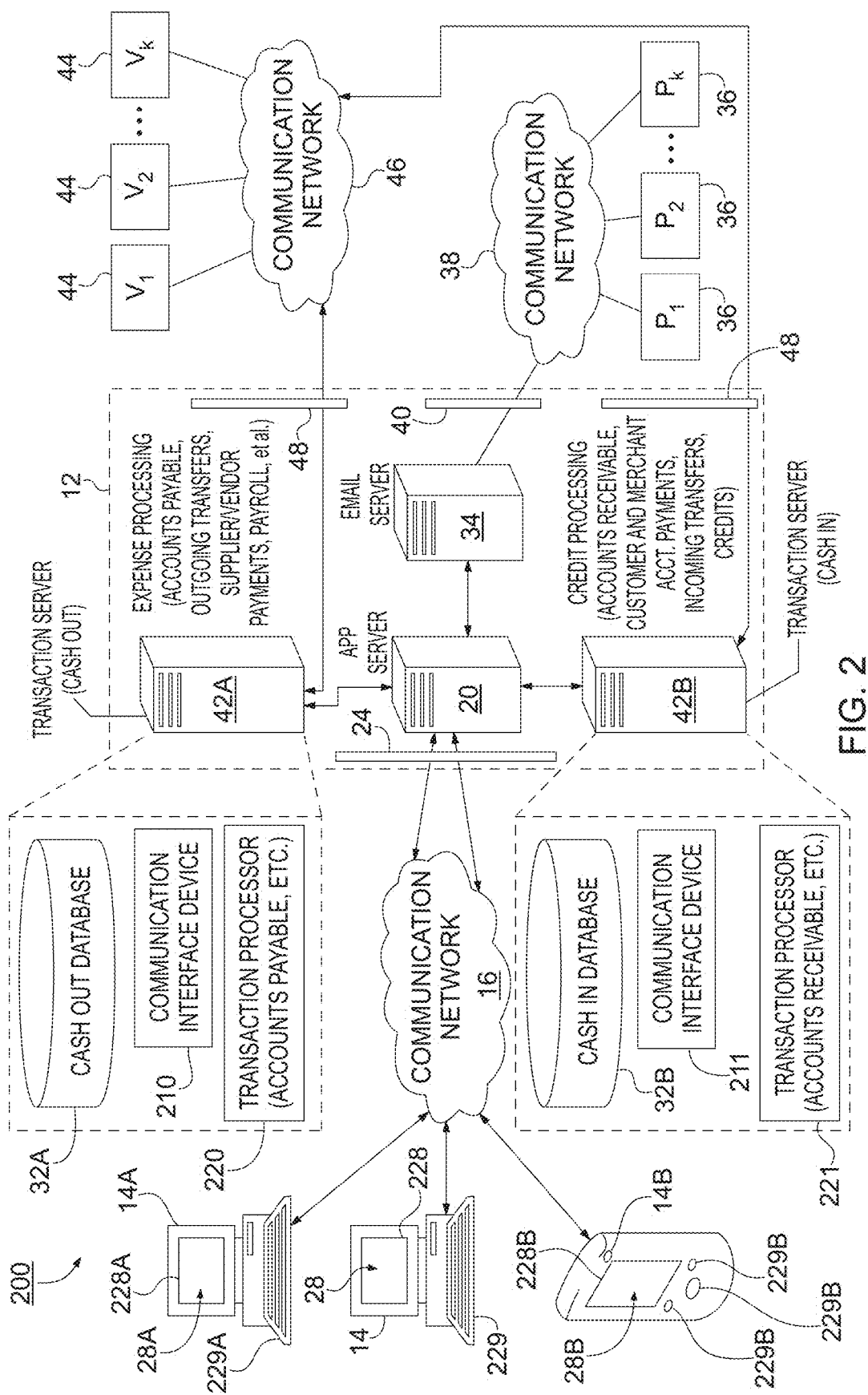
FIG. 2 depicts an exemplary system in which financial planning based on actual and planned cash positions in financial accounts can be performed, in accordance with an exemplary embodiment of the present disclosure.

FIGS. 1 and 2 illustrate a network architecture and system, respectively for financial planning based upon actual cash positions, actual and planned cash out transactions and actual and planned cash in transactions for accounts associated with an entity. The exemplary network architecture and system depicted in FIGS. 1 and 2 comprise a financial planning network and system, respectively.

FIG. 1 illustrates a system 10 according to embodiments of the present disclosure for providing network-based banking services to customers via a UI, including financial planning tool in addition to products for creating, managing, and projecting cash flow for an entity's financial accounts. Examples of systems and methods for projecting and managing cash flow for an entity's financial accounts are described in concurrently-filed and commonly assigned U.S. patent application Ser. No. 14/098,736, to be determined, entitled "SYSTEMS AND METHODS FOR PROJECTING AND MANAGING CASH FLOW FOR FINANCIAL ACCOUNTS"; concurrently-filed and commonly assigned U.S. patent application Ser. No. 14/098,698, to be determined, entitled "SYSTEMS AND METHODS FOR PROJECTING AND MANAGING CASH-IN FLOW FOR FINANCIAL ACCOUNTS"; and concurrently-filed and commonly assigned U.S. patent application Ser. No. 14/098,844, entitled "SYSTEMS AND METHODS FOR PROJECTING AND MANAGING CASH-OUT FLOW FOR FINANCIAL ACCOUNTS", which are all incorporated herein by reference in their entireties. Exemplary systems and methods for creating and managing an entity's financial accounts are described in concurrently-filed and commonly assigned U.S. patent application Ser. No. 14/098,873, entitled "SYSTEMS AND METHODS FOR CREATING AND MANAGING FINANCIAL ACCOUNTS", which is incorporated herein by reference in its entirety. As shown in FIG. 1, the system 10 includes a host system 12 in communication with one or more client devices $C_1, C_2 \ldots C_i$ 14 (hereinafter referred to as "clients 14") via a communications network 16. The communications network 16 may be the Internet, although it will be appreciated that any public or private communication network, using wired or wireless channels, suitable for enabling the electronic exchange of information between the client 14 and the host system 12 may be utilized.

The host system 12 may be implemented by a bank or other financial institution (hereinafter referred to as "host institution") and is configured to provide network-based product and service features to users (e.g., customers of the host institution 12) associated with the clients 14. The clients 14 may include any form of mobile or portable device and any suitable network-enabled devices such as, for example, PCs, laptop computers, palmtop computers, mobile phones, mobile tablets, PDAs, etc. configured to transmit and receive information via the communications network 16 using wired or wireless connections.

Clients 14 are capable of receiving user input via an input device. According to embodiments, the input device may be one or more of a touch-sensitive display such as a touch screen interface, a keyboard, a microphone, or a pointing device such as a mouse or stylus (see input devices 229 in FIG. 2). Clients 14 also include a display device (see display devices 228 of FIG. 2 and display 1730 of FIG. 17) capable of rendering an interactive GUI, such as the user interface ("UI") 28 discussed below. The input device 229 allows a user to interact with the GUIs described below with reference to FIGS. 3-16 to instruct the network 100 and systems 200 and 1400 discussed herein with respect to FIGS. 1, 2 and 17, respectively, to display and edit financial planning information, which is then rendered in the display device. For example, the interactive interfaces for the financial planning GUIs and graphs described below with reference to FIGS. 3-16 can be rendered in a UI 28 of a client 14 via the display device 228 of the client 14. Alternatively, the GUIs referred to in FIGS. 3-16 can be rendered on a display device of one or more servers, such as the email server 34, transaction server 42, web server 18, application server 20, and database server 22 shown in FIG. 1.

In exemplary embodiments, a client 14 can be, but is not limited to, a personal computer ("PC"), a Personal Digital Assistant ("PDA"), a tablet computing device, an iPhone™, an iPod™, an iPad™, a device operating the Android operating system ("OS") from Google Inc., a device running the Microsoft Windows® Mobile OS, a device running the Microsoft Windows® Phone OS, a device running the Symbian OS, a device running the webOS from Hewlett Packard, Inc., a mobile phone, a BlackBerry® device, a smartphone, a hand held computer, a netbook computer, a palmtop computer, a laptop computer, an ultra-mobile PC, a portable gaming system, or another similar type of mobile computing device having a capability to communicate via the communications network 16. Certain embodiments of clients 14 are depicted in FIG. 2, which is described below.

In some embodiments, the host system 12 may be based on a multi-tiered network architecture, and includes a web server 18 (Tier 1), an application server 20 (Tier 2), and a database server 22 (Tier 3). The web server 18 corresponds to the first tier of the host system 12 and is configured to communicate with the communication network 16 via a border firewall 24, and with the application server 20 via an application firewall 26. The web server 18 may be configured to accept information requests, such as, for example, HTTP requests, from one or more of the clients 14 via the communication network 16 and provide responses thereto. The responses may include, for example, HTTP responses including static and/or dynamic HTML documents for providing an Internet banking user interface ("UI") 28 to users via the clients 14. Additionally, the web server 18 may further be configured to authenticate each user before allowing access to the UI 28 and other resources associated with the host system 12. Authentication may be performed, for example, by the user inputting a user name and a password.

The application server 20 corresponds to the second tier of the host system 12 and is configured to communicate with the web server 18 via the application firewall 26, and with the database server 22 via an internal firewall 30. The application server 22 may host one or more applications executing logic to provide banking product and service features to each user via their respective UI 28. The application server 30 receives user-entered information (e.g., user name and password associated with the user and a request to access particular banking features) from the UI 28 of each client 14 via the web server 18. Based on this and other information received from the clients 14, applications hosted by the application server 30 may be invoked to perform financial transactions (e.g., transfer funds between accounts, retrieve account balances, pay bills, create new accounts, etc.) and generate corresponding informational content (e.g., transfer confirmations, account balance information, bill payment confirmation, account creation confirmation, etc.). Information regarding such transactions may be communicated to the web server 18 and subsequently presented to the users using, for example, a dynamic web page of the UI 28. Additionally, the application server 22 may also host an application for enabling users to conduct email communication with the host institution 12 and other parties, as well as an application for enabling transactions and vendors.

The database server 22 corresponds to the third tier of the host system 12 and is configured to communicate with the application server 20 via the internal firewall 30. The database server 22 manages one or more databases $DB_1$, $DB_2 \ldots DB_j$ 32 (hereinafter referred to as "databases 55") which store data to support one or more applications hosted by the application server 20 or elsewhere. Such databases may include, for example, account information databases, account configuration databases, new account opening databases, document identification/authentication databases, user information databases, user identification/authentication databases, user preferences/settings databases, as well as databases for storing other settings and/or configuration data. Database information requested by a particular application is retrieved from the databases 32 by the database server 22, communicated to the requesting application, and updated by the database server 22 as needed.

The host system 12 may further include an email server 34 which is configured to communicate with the application server 20. The email server 34 typically includes an email client application for enabling the exchange of electronic communications between the clients 14 and one or more parties $P_1, P_2 \ldots P_k$ 36 (hereinafter referred to as "parties 36") external to the host system 12 via a communications network 38. The communication networks 16, 38 may be a common communication network (e.g., the Internet). The parties 36 may be any person or entity with whom a user desires to communicate regarding particular aspects of his/her finances or financial matters generally. The user may have, or desire to have, a financial relationship with the parties 36. Such parties may include, but are not limited to, billing parties (e.g., utility companies, mortgage companies, credit card companies, etc.), and other parties having an existing financial relationship with the user (e.g., roommate, spouse, business partner, financial advisor, etc.). Typically, the host name of the email server 60 is determined by a registered domain name of the host institution (e.g., xyzbank.com), but other nomenclature may be used.

The host system 12 may include an email firewall 40 disposed between the email server 34 and the communication network 38. To supplement network traffic protection provided by the email firewall 40, the email server 34 may implement one or more policies and anti-virus scanning software for intercepting email (e.g., "spam" email) unrelated to financial matters and possibly including malicious content. A user may be allowed to view intercepted email and authorize trusted senders.

The host system 12 may further include a transaction server 42 which is configured to communicate with the application server 20. The transaction server 42 typically includes a client transaction application for enabling transaction between the clients 14 (which may also indicate customers) and one or more vendors $V_1, V_2 \ldots V_k$ 44 (hereinafter referred to as "vendors 44") external to the host system 12 via a communications network 46. The communication networks 16, 38, 46 may be a common communication network (e.g., the Internet). The transaction 42 server includes functionality to allow customers to remit payment to any of the vendors 44 directly from one of their financial accounts. When a transaction is authorized (e.g., by signature, by PIN number, etc.), the vendor 44 may communicate a request for payment to the transaction server 42 via the communications network 46. When a request for payment is received from a vendor 44, the transaction server 42 and/or the application server 22 may initiate appropriate steps to remit payment to the vendor 44 from a financial account (e.g., checking account, savings account, money market account, etc.) of the customer. As shown in FIG. 1, a transaction firewall 48 is disposed between the transaction server 42 and the communications network 46 for network traffic protection The clients 14, as discussed above, may be PCs and/or other network-enabled devices (e.g., cell phones, mobile phones, mobile tablets, PDAs, etc.) configured to transmit and receive information via the communication network 16 using a wired or wireless connection. The clients 14 may include a suitable browser software application (e.g., Internet Explorer, Internet Explorer Mobile, Firefox, Blazer, etc.) for enabling the user to display and interact with information exchanged via the communication network 16. The clients 14 may thus access and navigate static and/or dynamic HTML documents of the UI 28.

To allow customers to open accounts remotely, embodiments of the application server 20 can include applications to enable users to transmit, and the host system 12 to identify and authenticate, various materials required for opening accounts. This provides added convenience for customers in that they do not have to travel to a branch or other location to open an account. Similarly, the client 14 can include applications thereon, accessible via the UI 28, that communicate with the applications in the application server 20 to effectuate opening of an account remotely. In order to provide for the transmission of documents and other materials that may be required for opening an account, the client 14 should have a camera built into the device to facilitate taking pictures of the documents and transmitting them to the host institution 12. Additionally, while paper signature cards are typically preferred, the client 14 can also include a touch screen signature feature that provides for the transmission of touch screen signatures that may be used for comparison paper-based signatures. Alternately, a touch screen signature device may be operatively connected to the client 14 to provide for the transmission of touch screen signatures.

FIG. 2 depicts an exemplary system 200 in which financial planning for one or more financial accounts associated with an organization can be performed. FIG. 2 is described with continued reference to the embodiment illustrated in FIG. 1. However, FIG. 2 is not limited to that example embodiment.

As shown in FIG. 2, the financial planning system 200 can be configured to view and edit financial plans and planned cash out and cash in transactions between and among a plurality of clients 14, including mobile client devices 14 and a plurality of transaction servers 42 through communications sent via communications networks 16, 38, and/or 46. The transaction servers 42A and 42B can be any type of server or computing device capable of serving data from a databases 32A and 32B to one or more client devices 14, including the mobile devices 14 depicted in FIG. 2. For example, the transaction servers 42 can include, but are not limited to, a computer or a cluster of computers that may be a part of a server farm.

As depicted in FIG. 2, the display devices 228 of the clients 14 can differ depending on the type of computing device used as a particular client 14. For example, a display device 228A of a tablet device, netbook, or laptop such as client 14A is typically an integrated LCD screen, which is often smaller than a monitor or console such as the display device 228 for a workstation or desktop PC such as client 14. Similarly, the display device 228B of a mobile computing device such as client 14B may be a relatively small display such as mobile phone display.

The input devices 229 can also vary depending on the characteristics of a particular client 14 and its display device 228. For example, the input device 229 of a tablet, netbook, or laptop client 14A may include a relatively small physical or touchscreen keyboard, an integrated camera, track pad, and/or microphone, while the input device 229 of a desktop PC or workstation client such as client 14 will typically include a physical QWERTY or Dvorak keyboard and a mouse. Also, for example, an input device 229B of a mobile client 14B will typically lack a full physical keyboard and may instead comprise one or more of a touch-screen keyboard, a microphone, an integrated camera, a track pad, a scroll wheel, a track ball, a T9 keyboard, a button, and a touch screen display device 228B. In embodiments, any of the display devices 228 can be a touch screen display. It is to be understood that in the case of a touch screen interface, the input device 229 can be anything capable of interacting with the touch screen, including a user's fingers, which can be used to select, slide, drag, and resize (i.e., expand, maximize, shrink, and/or minimize) interactive UI elements through pointing, pinching, and scrolling gestures.

In accordance with embodiments, the UI 28 can be tailored to or customized for a particular client 14 based on the capabilities of the platform used by that client 14. The platform comprises physical capabilities of the client's 14 computing device such as, memory capacity in terms of random access memory ("RAM") and read only memory ("ROM"), central processing unit ("CPU") capabilities in terms of clock speed and available processing capacity, available storage in terms of disk space or flash memory, communications capabilities in terms of current wired and/ or wireless network connectivity and a communications interface (see, e.g., communications interface 210 and 211 of FIG. 2) such as a network interface card ("NIC") of the computing device, capabilities of the display device 228, and capabilities of the input device 229. These physical capabilities and others can be determined based on a manufacturer, model number, serial number, a Media Access Control address ("MAC address") and/or another unique identifier of a computing device used as a client 14.

The platform of a client 14 also comprises software and firmware components, such as an operating system ("OS") running on the client 14, Internet browser(s), native software applications installed, and privileges/permissions associated with the client 14. The privileges/permissions may be controlled by the host system 12 based on a user and/or an entity associated with the client 14 and can include data access, communications, and application execution privileges.

According to embodiments, the UIs 28A and 28B for mobile clients 14A and 14B may be rendered as streamlined, "mobile friendly", versions of the "full" UI 28 for ease of use on relatively small display devices 228A and 228B. In embodiments, mobile friendly UIs 28A, 28B may have reduced capabilities and/or display a lesser level of detail as compared to the full UI 28. A mobile friendly UI 28B can also be tailored to accept input from input devices 229B for a specific platform of a mobile client 14B. The mobile friendly UIs 28A and 28B can be automatically selected by the system 200 in response to detecting one or more platform characteristics of a particular mobile client 14A or 14B. Alternatively, a user of a mobile client 14A or 14B can be prompted within the full UI 28 to opt-in to using the mobile friendly UIs 28A and 28B in response to detecting that the client 14A or 14B is accessing the host system 12 via a mobile computing device. In cases where a user's mobile client 14A, 14B has a display device 228A, 228B and input device 229A, 229B capable of using the UI 28, the user may not wish to use the mobile friendly UI 28A or 28B.

According to embodiments, such as those depicted in FIGS. 3-16, the UI 28 allows financial planning operations to be performed and displayed with a greater level of detail than the mobile friendly UIs 28A and 28B. For example, the granularity of editing and scheduling planned transactions may be finer (i.e., more detailed) in the UI 28 as compared to the mobile friendly UIs 28A and 28B.

The one or more of the communications networks 16, 38, and 46 can be any network or combination of networks that can carry data communications. Such networks can include, but are not limited to, wireless data networks such as a Wi-Fi, 3G, and a 4G/LTE network. In addition, the communications networks 16, 38, and 46 shown in FIG. 2 can include, but are not limited to a wired Ethernet network, a local area network ("LAN"), a medium area network, and/or a wide area network ("WAN") such as the Internet. In exemplary implementations of system 200 including wireless networks, one or more of the communications networks 16, 38, and 46 can support protocols and technology including, but not limited to, Internet or World Wide Web protocols and/or services. Intermediate network routers, gateways, or servers (not shown) may be provided between components of the architecture 10 and the system 200 depending upon a particular application or environment.

With continued reference to the exemplary embodiment of FIG. 2, multiple transaction servers 42A and 42B can be used as part of the system 200. For example, a first transaction server 42A can be used for processing cash in transactions and second, separate transaction server 42B can be employed to process cash out transactions. In alternative embodiments, the functionality and components of transaction servers 42A and 42B can reside on a single transaction server 42, such as the transaction server 42 shown in FIG. 1.

As shown in FIG. 2, a transaction server 42A can process an entity's cash out transactions, including for example debits, and expenses, such as, but not limited to, accounts payable, outgoing transfers to external accounts, including accounts not handled by host system 12 and/or accounts not associated with the entity, payments to suppliers/vendors for the entity, and the entity's payroll. Data for such cash out transactions can be stored in and retrieved from a cash out database 32A. Although the cash out database 32A is depicted in FIG. 2 as being hosted locally on the transaction server 42A, it is to be understood that in alternative embodiments, the cash out database 32A can be hosted on a server remote from the transaction server 42A, such as a dedicated relational database management server (RDBMS).

The transaction server 42A can communicate with other components of system 200 via communications networks 16, 38 and 46 using a communications interface device 210. For example, communications between the transaction server 42A and clients 14, the application server 20, the email server 34 and the transaction server 42B can be handled by the communications interface device 210. In the embodiment illustrated in FIG. 2, the transaction server 42A includes a transaction processor 220 comprising modules configured to process cash out transactions such as, but not limited to, accounts payable transactions. In embodiments, these modules can be comprised of computer-executable instructions or program logic that use information from and store data in the cash out database 32A. The modules can also obtain from and send information to other components of the system 200 using the communications interface device 210 to communicate via communications networks 16, 38, and 46. As shown in FIG. 2, because this data can include sensitive financial account information, communications may be received from clients 14 via a border firewall 24 between the communications network 16 and the host system 12, an email firewall 40 disposed between the email server 34 and the communication network 38, and/or a transaction firewall 48 disposed between the transaction servers 42 and the communications network 46.

With continued reference to FIG. 2, another transaction server 42B can process an entity's cash in transactions and credits, such as, but not limited to, accounts receivable, the entity's customer and merchant account payments, and incoming transfers from external financial accounts, including accounts not associated with the entity, can be stored in and retrieved from a cash in database 32B. Data processed and stored by transaction server 42B is part of the entity's actual cash in amount. Although the cash in database 32B is depicted in FIG. 2 as being hosted locally on the transaction server 42B, it is to be understood that in alternative embodiments, the cash in database 32B can be hosted on a server remote from the transaction server 42B, such as a remote RDBMS.

The transaction server 42B can communicate with other components of the system 200 via communications networks 16, 38 and 46 using a communications interface device 211. For example, communications between the transaction server 42B and clients 14, the application server 20, the email server 34 and the transaction server 42A can be handled by the communications interface device 211. In the embodiment illustrated in FIG. 2, the transaction server 42B includes a transaction processor 221 comprising modules configured to process cash out transactions such as, but not limited to, accounts receivable transactions. In embodiments, these modules can be comprised of computer-executable instructions or program logic that use information from and store data in the cash in database 32B. The modules can also obtain from and send information to other components of the system 200 using the communications interface device 211 to communicate via communications networks 16, 38, and 46. As shown in FIG. 2, because this data can include sensitive financial account information, communications may be received from clients 14 via a border firewall 24 between the communications network 16 and the host system 12, an email firewall 40 disposed between the email server 34 and the communication network 38, and/or a transaction firewall 48 disposed between the transaction servers 42 and the communications network 46.

Planner Tool

In an embodiment, a Planner is a graphical tool configured to enable users associated with an entity to plan future year cash flow goals for the entity based on the entity's previous transaction activity. The Planner tool may be configured to enable users associated with an entity to plan future year cash flow goals for the entity based on previous transaction activity by taking in to account cash out, which includes payables, and cash in, which includes receivables, and Net Amounts, which can be seen as Cash out transactions subtracted by Cash in transactions. The Planner tool may also provide a graphical view of a user's previous financial transaction performance and uses it to projected future year cash flow.

Information regarding Net Amounts, Cash out, and Cash in may be obtained from an account that is linked to the information displayed in the Planner. The account may be held by the host institution or it may be an account with a foreign institution. A foreign institution indicates an institution that is outside of the host institution. For example, if the host institution is a bank, the foreign institution may be a non-affiliated bank or other financial establishment. Linking an account to the information displayed by the Planner may provide a user with information that is kept up to date and accurate. In the situation where the linked account is an account with the host institution, data can be gathered and kept up to date in real-time so that information displayed by the Planner is as accurate as possible. For example, this can be account balance information that is kept with a bank that is the host institution. The account balance information is therefore more accessible, since both the account and Planner tool are in control of the host institution, and errors in the corresponding information displayed by the Planner may be reduced.

The Planner tool allows for functionality choices that combine to create many different paths or layers for a user to view account information. This includes, for example, being able to view cash in, cash out, and net, all of which may be viewed in present or in past amounts. This also includes the ability to summarize totals by quarter or by month and to be able to drill down into a single year by a specified category. The level of detail with which this information is viewable can be determined by the user.

A projection of future cash flow may be calculated and displayed in the Planner as the "Jaggedy Wedge". Using the Jaggedy Wedge, the Planner tool is able to display to a user the best and worst case cash flow scenarios that may be based on past performance. The Jaggedy Wedge may be implemented in any of the net, cash in, or cash out amounts. The range of values displayed by the Jaggedy Wedge may also be based on a range input by a user or a suggested projection using predetermined algorithms. The algorithms can be based off of host information, such bank account information provided by a financial service provider, for example a bank. The algorithm for the Jaggedy Wedge may also work off of each business's cyclical trend, recent transactions, and/or industry trends.

Example User Interfaces for Financial Planning

FIGS. 3-16 illustrate exemplary GUIs, aspects thereof, and graphs for a financial planning tool, according to embodiments of the present disclosure. The GUIs, aspects, and graphs depicted in FIGS. 3-16 are described with reference to the embodiments of FIGS. 1 and 2. However, the GUIs, aspects, and graphs are not limited to those example embodiments. FIGS. 3-16 illustrate an exemplary financial planning interface comprising various GUIs for displaying data related to an entity's actual cash position, actual and planned cash in transactions, and actual and planned cash out transactions, in accordance with exemplary embodiments.

The terms "console display", "display", "display screen", and "screen" are used interchangeably herein to refer broadly and inclusively to any type of display device or screen coupled to or integrated with a computing device for displaying content viewable by a user of the computing device, such as a user of a client 14. In an embodiment, the client 14 is a mobile computing client 14A or 14B. Such a display screen can include, for example and without limitation, a touch-screen liquid crystal display ("LCD"). In certain exemplary embodiments, the GUIs and graphs of FIGS. 3-11 are viewed on a display of a mobile computing device, such as a display device 228 of a mobile client 14A or 14 B. In other embodiments, the GUIs, aspects thereof, and graphs shown in FIGS. 3-16 are viewed on a display of a server (i.e., a server console) such as consoles of servers 18, 20, 22, 34, or 42 shown in FIG. 1, a desktop computer (i.e., a PC monitor), or a laptop display, such as display devices 228 of clients 14 and 14A depicted in FIG. 2.

In the examples shown in FIGS. 3-16, the user interface and consoles are rendered in a dedicated, native interface. In alternative embodiments, the GUIs can be web based and rendered within a web browser. In other embodiments, the GUIs illustrated in FIGS. 3-16 can be displayed on server or workstation displays having a touch sensitive (i.e., touch screen) display. For ease of explanation, the operation of the GUIs are discussed in the context of a computing device platform with an input device such as a mouse or pointing device (including a touch-screen), but is not intended to be limited thereto. Examples of such computing device platforms include, but are not limited to, OSX server and workstation operating systems ("OSs") from Apple, Inc.; WINDOWS® server and workstation OSs from the MICROSOFT™ Corporation; UNIX-based OSs, and Linux OSs, such as, but not limited to, Linux from RedHat™ Inc.

In alternative embodiments, the GUIs of FIGS. 3-16 can be rendered on a display 228 of a mobile client 14 implemented as a mobile computing device such as, but not limited to a personal digital assistant ("PDA"), an iPhone™, an iPod™ touch, or iPad™ tablet device, a device operating the Android operating system ("OS") from Google Inc., a device running a MICROSOFT™WINDOWS® Mobile or Phone OS, a device running a Symbian OS, a device running a PALM OS®, a BLACKBERRY® device running a Blackberry OS from Research In Motion ("RIM"), a smart phone, a hand held computer, a netbook computer, a palmtop computer, a laptop computer, an ultra-mobile PC, or another similar type of mobile device capable of processing instructions and receiving and transmitting data to and from users and other computing devices.

It is to be understood that the GUIs illustrated in the exemplary embodiments of FIGS. 3-16 can be readily adapted to execute on a display of mobile device platforms and operating systems, a computer terminal, a display of a client 14, a display console of a server, or other display of a computing device. Thus, the examples shown in FIGS. 3-16 can be rendered on a display of mobile clients 14A and 14B using an online banking application, within a web browser session, on a display console of a server, or on a display of a client 14 running an online banking application.

Throughout FIGS. 3-16, displays are shown with various icons, tabs, check boxes, toggles, folders, panes, command regions, interfaces, windows, check boxes, slide-able elements, tiles, data entry fields, drop down menus, and buttons that are used to initiate action, invoke routines, display and edit data related to an entity's financial accounts, or invoke other functionality. The initiated actions include, but are not limited to, viewing entity's cash position, viewing and modifying planned cash out and cash in information, displaying financial planning graphs, inputting user/entity preferences, and other financial planning navigation inputs and gestures. For brevity, only the differences occurring within the figures, as compared to previous or subsequent ones of the figures, are described below.

FIGS. 3-16 illustrate various displays of the user interface ("UI") 301 according to various embodiments of the Planner tool. UI 301 may be implemented as UI 28, 28A, or 28B as previously described. In addition, the UI 301 may be implemented, for example, as a dynamic HTML Web page hosted by the web server 18 that is accessible by a client 14 subsequent to a user or customer authentication. In certain embodiments and as shown, the UI 301 may be one of a plurality of linked screens that collectively define the UI 301. As discussed in further detail below, the UI 301 may include various graphic and text features designed to efficiently communicate information regarding aspects of the customer's finances. Such information may include, for example, a current balance in one or more accounts, a portion of a current balance required to satisfy approaching financial obligations, a portion of a current balance allocated toward a particular financial goal and amounts of scheduled bill payments and associated bill information.

In general, the UI 301 consists of a graphical section 303 and a spreadsheet section 305 that details historical, current, and possible future activity of an account and a plurality of selectable, actionable UI elements. As in the exemplary embodiments illustrated in FIGS. 3-16, the UI elements may be tabs, boxes for data input, check boxes and toggles. However, it is to be understood that in alternative embodiments, the UI elements can be, but are not limited to, icons, dialog boxes, slide-able elements, moveable elements, drag-able elements, prompts, hyperlinks, command regions, radio buttons, and other selectable elements. The UI elements may also be layered, such that, for example, by selecting one actionable UI element, other UI elements are made available. As shown in FIGS. 3 and 5-15 the solid lines 313, 413, or 513, of the graphical portion 303 in the UI 301 can be used to provide a display based on which UI element (shown as tabs: "Net" 307, "In" 309, or "Out" 311) is selected.

Figure 3:
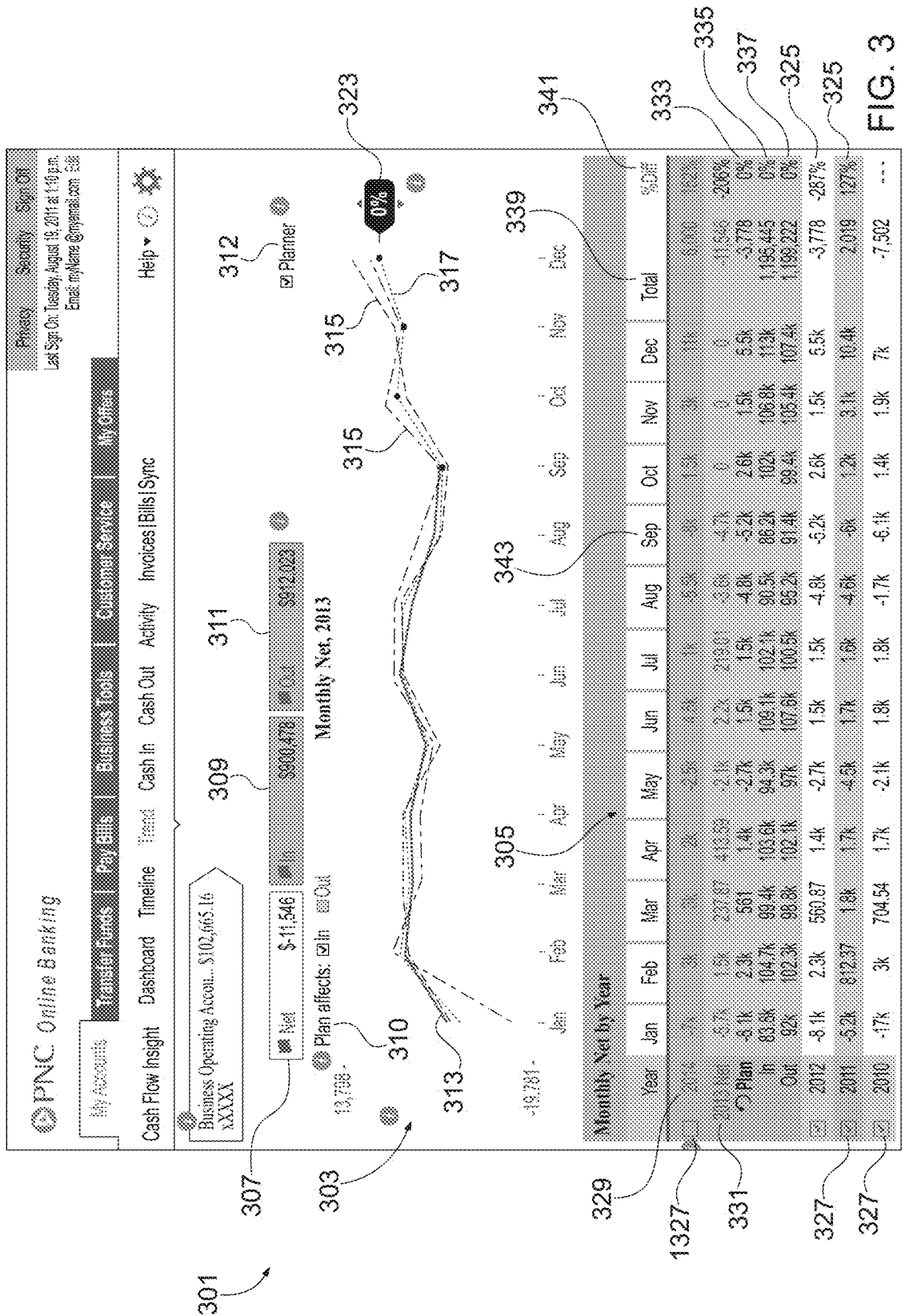
FIG. 3 illustrates an interactive graphical user interface ("GUI") displayed by a system when a "Net UI" element is selected, in accordance with an exemplary embodiment of the present disclosure.

Additionally, as shown in FIG. 3, when the UI element, represented as the Net tab 307, is selected the graphical section 303 provides a graph representation 313 of the actual net amount 331 of an account for each month of a current year represented by the columns in the spreadsheet section 305 that have complete data. The months with complete data include the most recent month with complete data 343 and all those before it. The graphical section 303 and the spreadsheet section 305 are generally shown together, however, this information may be contained on different tabs or other different UI elements.

Figure 10:
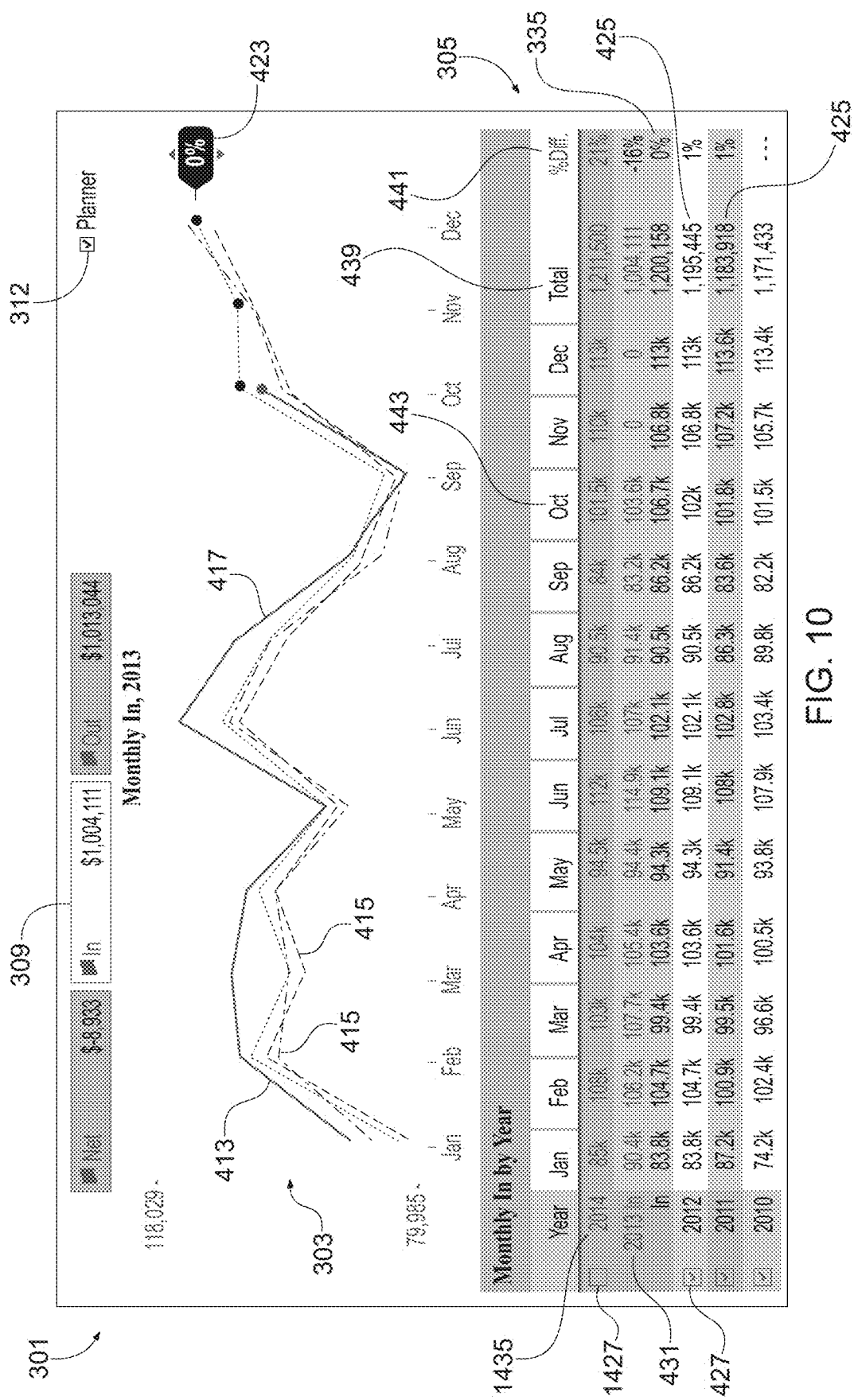
FIG. 10 illustrates a GUI of the present invention that is displayed when the Cash In UI element is selected and a planner toggle is selected, in accordance with an exemplary embodiment of the present disclosure.
Figure 13:
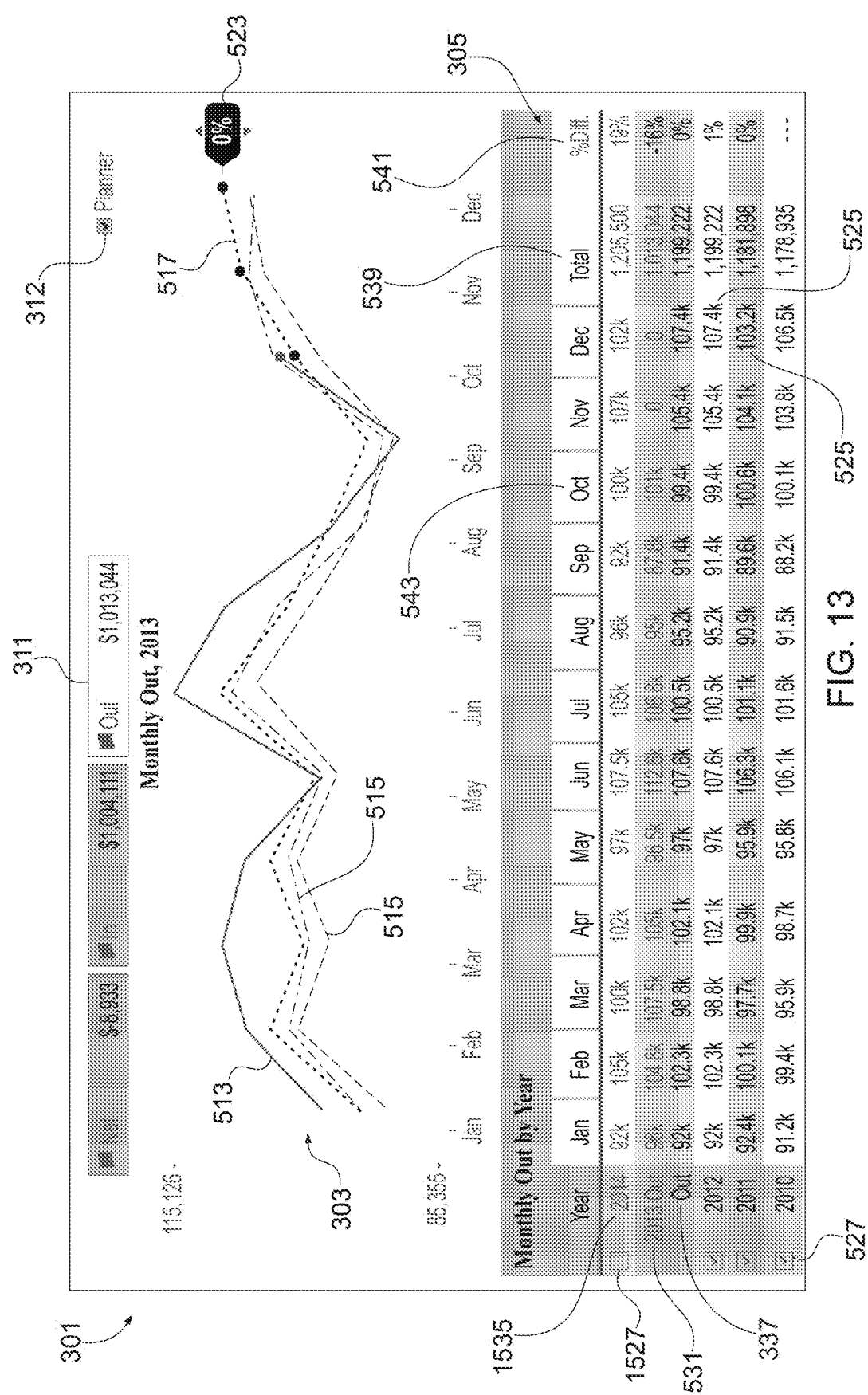
FIG. 13 illustrates a GUI of the present invention that is displayed when the Cash In UI element is selected and a planner toggle is selected, in accordance with an exemplary embodiment of the present disclosure.

Also as shown in FIG. 3, with the Net tab 307 selected, the spreadsheet section 305 provides actual net amounts 331 for the current year along with historical amounts 325 and planned or projected net amount values 333 (shown as "Plan"). The value for the actual net amount 331 depends on actual cash in amounts subtracted by actual cash out amounts recorded for an account. The actual cash in values 431 and actual cash out values 531 may be displayed only under the In 309 or Out 311 tabs (as shown in FIGS. 10 and 13), or they may be displayed with in Net tab 307 with the actual net amount 331 in the spreadsheet 305. The value for the actual net amount 331 may also depend on the posted balance, available balance, or pending balance of an account based on the choice of the host institution or the user.

Additionally, the ability to drill down further into the historical transaction data 325 may be provided. A user may be able to look into each of the individual transactions that makes up a month of historical transaction data 325. This may also be provided for historical transaction data 425 displayed in association with the In tab 309 and historical transaction data 525 displayed in association with the Out tab 311.

As shown in FIGS. 3, 10, and 13, the line, 317, 417, or 517, of the graphical portion 303 in the UI 301 can be used to provide a project plan display based on which one of the tabs, Net 307, In 309, or Out 311, is selected. The projected plan line provides a plan value for comparison to a user's account. The projected plan lines for the planned net amount 333, planned cash in 335, or planned cash out 337 may also be displayed on a single separate tab or a plurality of separate tabs from each of the Net 307, In 309, or Out 311 tabs. As shown in FIG. 3, the projected plan net line 317 represents the planned net amount 333. The planned net amount values 333 are a total of planned cash in values 335 (shown as "In"), also called planned receivables or sum of credits, subtracted by planned cash out values 337 (shown as "Out"), also called planned payables or sum of debits, for a given time period based on data stored in the host institution system. Each month of planned data is displayed, if available, for comparison purposes, but may or may not be editable based on the UI elements in which it is displayed or provided.

Figure 14:
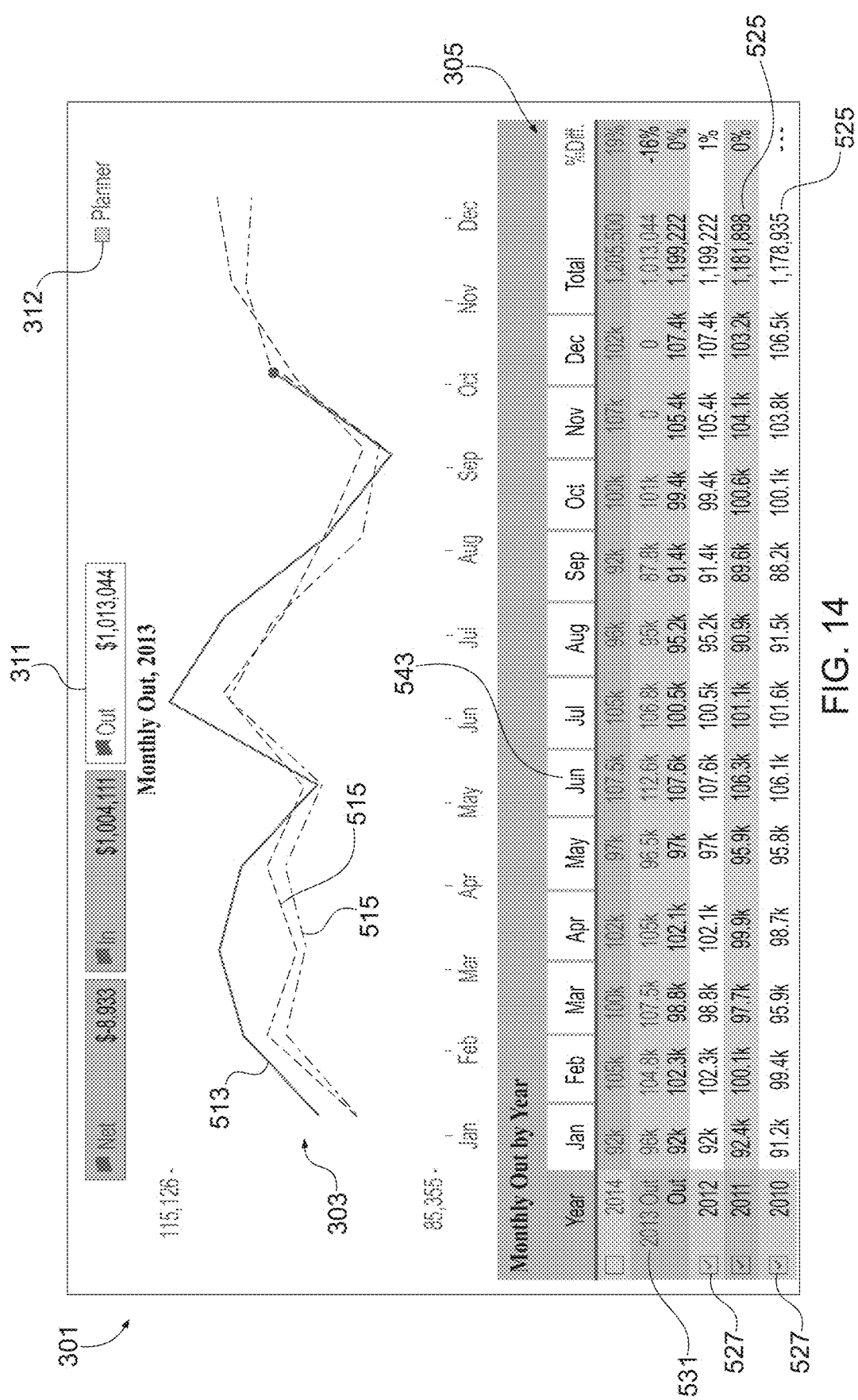
FIG. 14 illustrates a GUI of the present invention that is displayed when the Cash In UI element is selected and a planner toggle is deselected, in accordance with an exemplary embodiment of the present disclosure.
Figure 15:
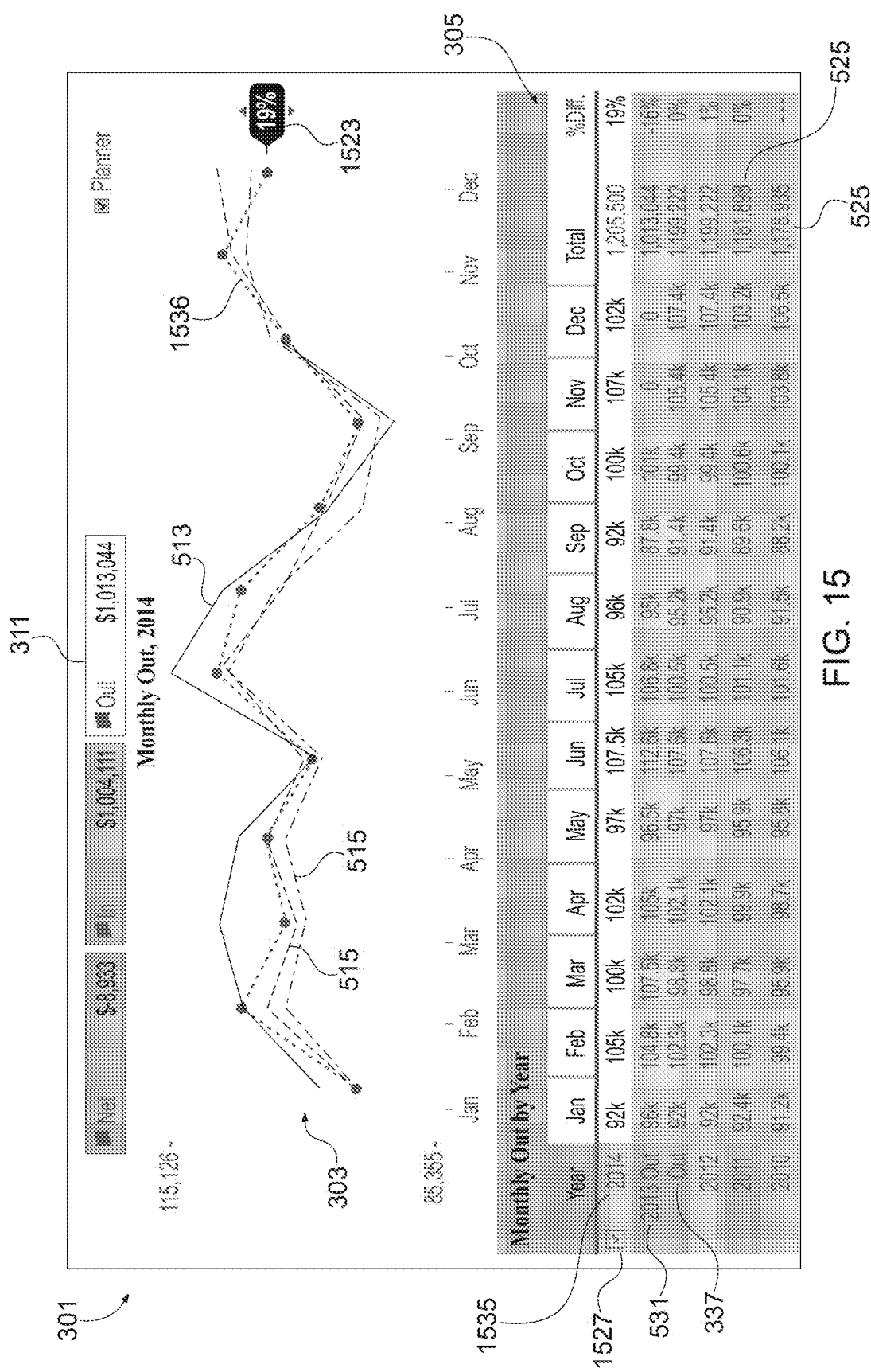
FIG. 15 illustrates a GUI of the present invention that is displayed when the Cash In UI element, the planner toggle, and a future year information UI element are selected, in accordance with an exemplary embodiment of the present disclosure.
Figure 16:
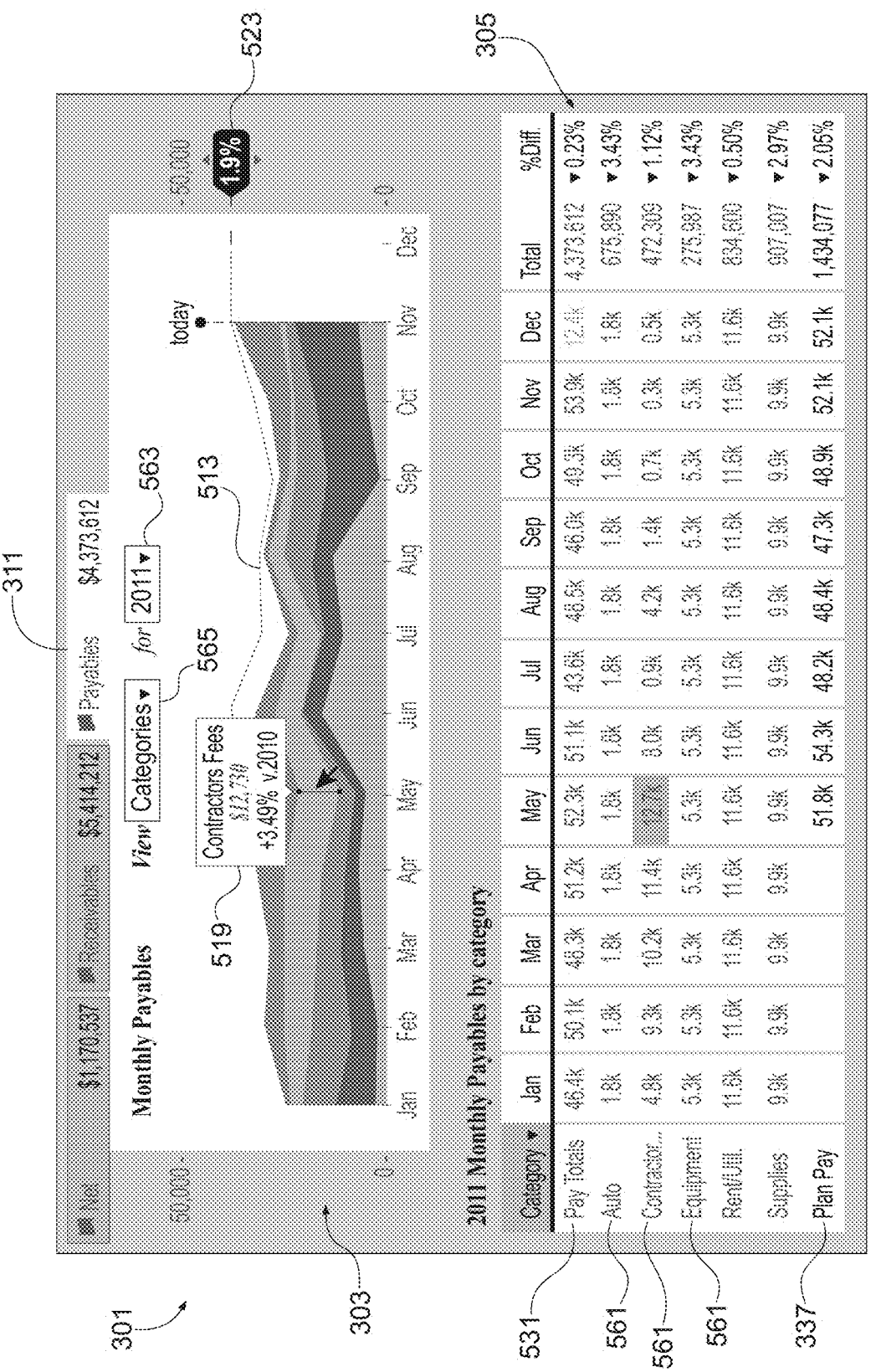
FIG. 16 illustrates a GUI of the present invention that is displayed when the Cash Out (shown as "Payables") UI element is selected in accordance with an exemplary embodiment of the present disclosure.

In addition, a future year row 329 is shown in FIG. 3 at the top of the spreadsheet section 305 and the year shown, "2014" in FIG. 3, may be based on the current calendar year displayed for the actual net amount 331. Similarly, as shown in FIGS. 10 and 13 respectively, a future year cash in row 429 or a future year cash out row 529 may be provided if the In tab 309 or Out tab 311 is selected. Additionally, as shown in FIG. 3, the actual net amount 331 for a current year is provided. The current year that is used for the examples in FIGS. 3, 5-8, and 10-15 is 2013, while the current year that is used for the examples in FIGS. 9 and 16 is 2011.

As shown in FIGS. 3 and 5-16, the columns of the spreadsheet section 305 represent each of the twelve months of the year while the rows represent yearly time periods. The time value for the spreadsheet section may be a default, as shown in twelve months on the horizontal axis and by year on the vertical axis, or in another embodiment it may be chosen by the host institution or a user. In addition, the columns may be sortable by amount or name of a respective column. Other typical spreadsheet functions may be provided by the spreadsheet section 305.

Additionally, all time periods used in the present disclosure are exemplary only unless otherwise specified. For instance the use of the "future year cash in" connotes a time period of a year. However, as understood this is exemplary only, as year may be replaced based on a weekly, a monthly, a quarterly, or a semi-annual time period. Despite the literal terms of the present disclosure, all time periods can be represented based on what is most desired and applicable to a specific situation as determined by either a user or host institution.

As shown in FIGS. 3, 10, and 13, the spreadsheet section 305 may also have a total column 339, 439, 539 that displays the total year to date value of the net amount, cash-in, and/or cash-out depending on the tab 307, 309, 311 that is selected. Additionally, as shown in FIGS. 3, 10, and 13 a percentage difference 341, 441, and 541 may be displayed that shows a percent increase or decrease over a predetermined time period, for example a previous year's values. The percentage difference information may be presented as year-end information or for a particular month.

There may also be coordinated effects between the graph section 303 and spreadsheet section 305, such as when a user hovers on a point on a graph, that month's column may also appear highlighted. This can be adjusted according to spatial and temporal display of the graph, for instance if the graph displays more or less than a month's worth of data as an individual point, hovering over that point may highlight an entire column or only a portion of the column depending on the coordinated nature of the graph and spreadsheet.

As shown in FIG. 3, the box next to each year in the rows, a checkbox 327 allows data for selected time values to be turned on (checked) or off (unchecked) in the graph section 303. Unchecking the checkbox for a specified year turns that year's corresponding row gray in the spreadsheet and removes it from the graph section 303. As illustrated in FIG. 3, the checkboxes 327 for rows of historical data 325, the years 2010, 2011, and 2012 in that case, are selected and are represented by the graph lines 315. Checkboxes 427 and 527, having similar functions are shown in FIGS. 10 and 13 based on the In tab 309 or the Out tab 311 being selected.

The default view of historical data in the UI 301 may be any number of years, for example three years of statement history may be the default amount of data shown. Data for previous years of financial history will continue to accumulate, be stored, and can be shown on spreadsheet section 305 and/or graph section 303 of the UI 301 based on a user's desire. The UI 301 may allow a user to enter cash flow history on the spreadsheet section 305 of the UI 301 if there is no automatically populated data (i.e. if the user is a customer with no linked account data). A user may also be able to edit the customer history data that is based on linked account data if, for example, an existing account is held by the host institution. The linked host data may comprises real-time cash flow information, such as cash values in accounts accessed from up-to-date banking information. Alternatively, a user may be able to enter cash flow history information by importing data from another financial software tool or general software tool, such as, for example QuickBooks, Excel, or CSV.

When a user interacts with the graph section 303 or spreadsheet section 305, a pop up or dialog box may appear on a chart displayed in the graph section 303. The pop up box may be configured to be displayed when a user's pointer or index hovers over a specific month column in the spreadsheet section 305 or when a user hovers over a specific point on a graph in the graph section 303. A pop up box may be configured to be displayed when a user's pointer or index hovers over a specific month column in the spreadsheet section 305 (while not shown this can also be configured to display when a user hovers over a specific point on a graph). The pop up box may also appear based on a touch, selection, or click of a user's pointer or index.

A pop up box (not shown) that results from hovering over column 343 of the spreadsheet section 305 may also display a plan amount that includes a dollar amount and a percentage change of the plan amount for the selected time frame, which may be shown as a current year versus a previous year, e.g. 2013 versus 2012. Additionally, the pop up box may display a net amount that includes a net dollar amount and a percentage change of the net amount for the selected time frame, which is also may be shown as the month versus that month in the previous year. The font for displaying such information can be chosen for better contrast. For example, the pop up box may be in black background with white font, or other color combinations.

The pop up box may be designed to display full dollar amounts for ease of interpretation. However, a corresponding value in the spreadsheet may be abbreviated to a rounded amount. For instance, the pop up box may display the plan number $48,186 that is rounded in thousands and displayed as $48.2. As an example, a pop up box 319 is shown in FIG. 9, may be configured to appear and function in the same fashion as with the Net tab 307 when In tab 309 or the Out tab 311 is selected, respectively.

The UI 301 may also be configured to represent multiple plans for multiple users and may also for saving and editing multiple plans, based on either a single user or multiple users. Each plan or year on a plan, or other appropriate time period, may be represented by a different color to allow for better comparison. In addition, the UI 301 may have the ability for a user to provide comments on specific time periods or transactions, depending on the application, and to hide a plan for time periods where the plan has not been edited. Furthermore, a printer-friendly aspect of the Planner tool may be incorporated to allow for all or a portion of the UI 301 or background data to be printed based on a user's desire. A print button (not shown) may be displayed on the UI 301 that provides printing from the Net tab 307, the In tab 309, or the Out tab 311. In addition, links can be included that provide comparisons to related industrial and/or business indexes (i.e. Wall Street on-demand, Federal Reserve, etc.). Further, a user may choose to forego a link and have such a comparison displayed directed on the UI 301.

Regardless of if a user is editing the plan under a particular UI element, such as the Net tab 307, In tab 309, or Out tab 311, when a data point on a graph is adjusted, the point itself may change color, size, or other visible cue. For example, the modified data point may be represented as a bold black dot and a pop up box that appears associated with the modified data point may also have a black background. If a user has not edited a data point on a graph, an associated pop up box may have a white background to distinguish between the edited data and non-edited data. When something is in the past (i.e. not editable), the pop up box may also have a background color that distinguishes it.

A user may also edit the planned cash in values 335 or planned cash out values 337 directly on the spreadsheet 305 based on the UI elements of the spreadsheet section 305. Similarly, a user may also edit the planned net amount 333 value as well. This will re-draw the graph of projected plan line accordingly. Further, appropriate re-calculations will also be made automatically to maintain balance of planned cash in values 335 minus planned cash out values 337 such that these numbers equal the planned net amount values 333. According to an embodiment, all changes are also incorporated automatically into the total column 339.

The UI 301 of the Planner tool allows a plan line to be modified through UI elements in various ways such that if the plan data is changed in one place, the changes are reflected throughout wherever the data is displayed and stored. For example, a user may modify a plan line by dragging a point on the graph of the projected plan line. And if a point on the graph is changed, the corresponding column and row value is modified in the spreadsheet, along with the corresponding value displayed in the percent change handle 323. The value of the percent change handle 323 may illustrate the cumulative change in percent of the planned net amount 333, shown as the projected plan net line 317 in FIG. 3 over a previous year. This is similar for the percent change handle 423, 523 that is displayed when either the In tab 309 or Out tab 311 is selected.

The projected plan net line 317 may begin from when the plan was last created by a user. In the example shown in FIG. 3, the projected plan net line 317 begins in January 2013. But the projected plan net line may begin at a later date if the plan was created, for example in the middle of a year. Further, the values of the planned net amount 333 represented by the projected plan net line 317 may include default values, for example, that are based on a percent increase or decrease over a previous year's values or a similar adjusted average of a selected range of previous year values. Further, a user can edit the projected plan net line 317 or the planned net amount 333, based on the UI elements and the edits may be auto-saved. In another preferred embodiment, the projected plan net line may show only those times where the user begins to edit the plan and thereafter. Similar functions and edits may be available with and made to the projected plan cash in graph 417 and the projected plan cash out graph 517, shown in FIGS. 10 and 13, respectively.

Also, as shown in FIG. 3, the UI 301 may include a plan affects selection 310 when the Net tab 307 is selected. The plan affects selection 310 provides a user with the choice of adjusting the planned cash in values 335 or the planned cash out values 337 when a change in the projected plan net line 317 is made.

Figure 4:
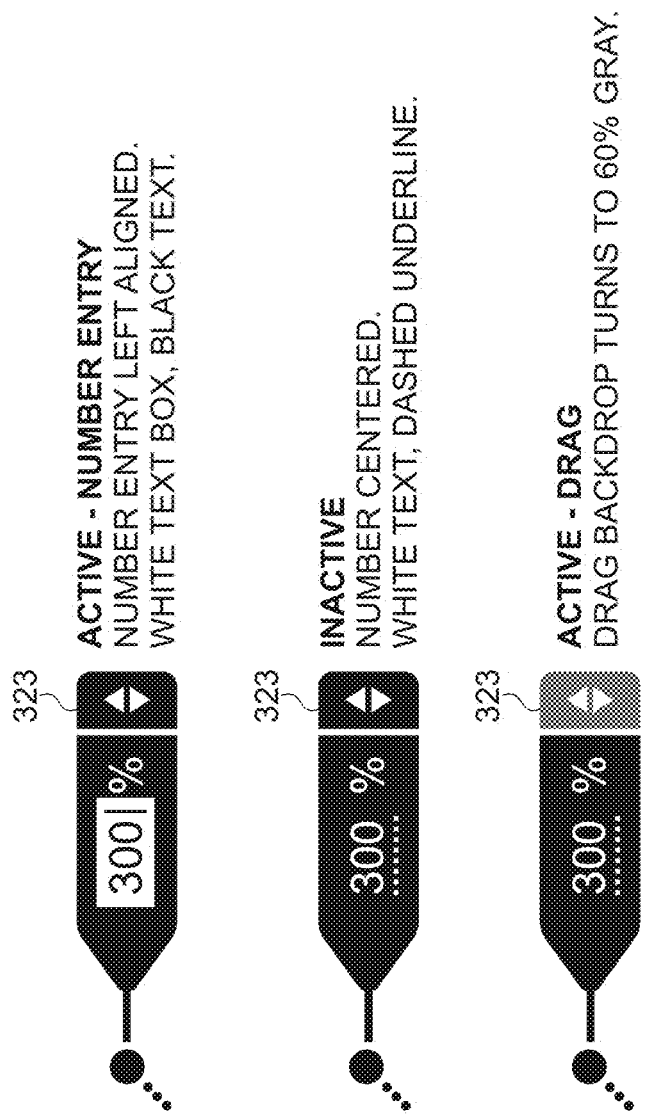
FIG. 4 illustrates the percent change handle in accordance with an exemplary embodiment of the present disclosure.

Referencing FIGS. 3 and 4, another way to modify the projected plan net line 317 can be accomplished by dragging the entire projected plan net line 317 vertically with the percent change handle 323 to relatively increase/decrease the projected plan net line 317 time-unit values at once. By using the percent change handle 323, a user can key in a new percentage change from a previous year.

As shown in the embodiments of FIG. 4, the percent change handle 323 may be indicated as active for number entry when numbers are able to be entered in the text box such that the text box is white and the text is black. In addition, the percent change handle 323 may be indicated as active for dragging when the draft backdrop turns to gray. In that case, dragging the percent change handle 323 will change the number shown in text. The percent change handle 323 may be indicated as inactive such that the text is white and has a dashed underline. Similar adjustments may be made via the percent change handle 423 and 523 to the projected plan cash in line 417 and the projected plan cash out line 517, respectively. In addition, a button to revert to a default projected plan, for any of the projected plan net graph 317, the projected plan cash in graph 417, or the projected plan cash out graph 517, may be provided for ease of use.

When the planner toggle 312 is checked, the UI 301 provides a projected plan line display based on which one of the tabs, Net 307, In 309 (associated with cash in values), or Out 311 (associated with cash out values), is selected.

Figure 5:
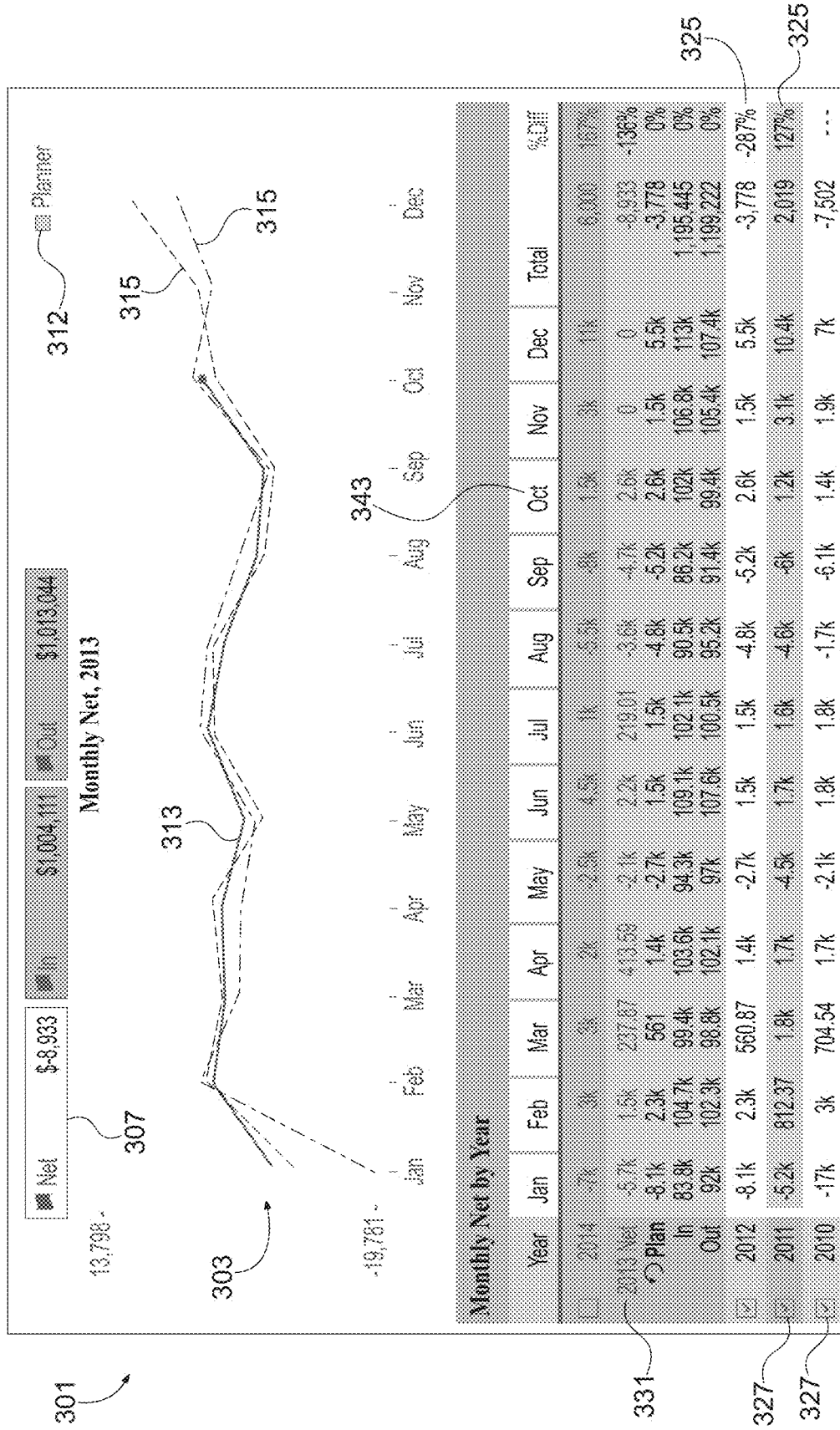
FIG. 5 illustrates an exemplary embodiment of the GUI of the present invention when the Net UI element is selected and a planner toggle is deselected.
Figure 11:
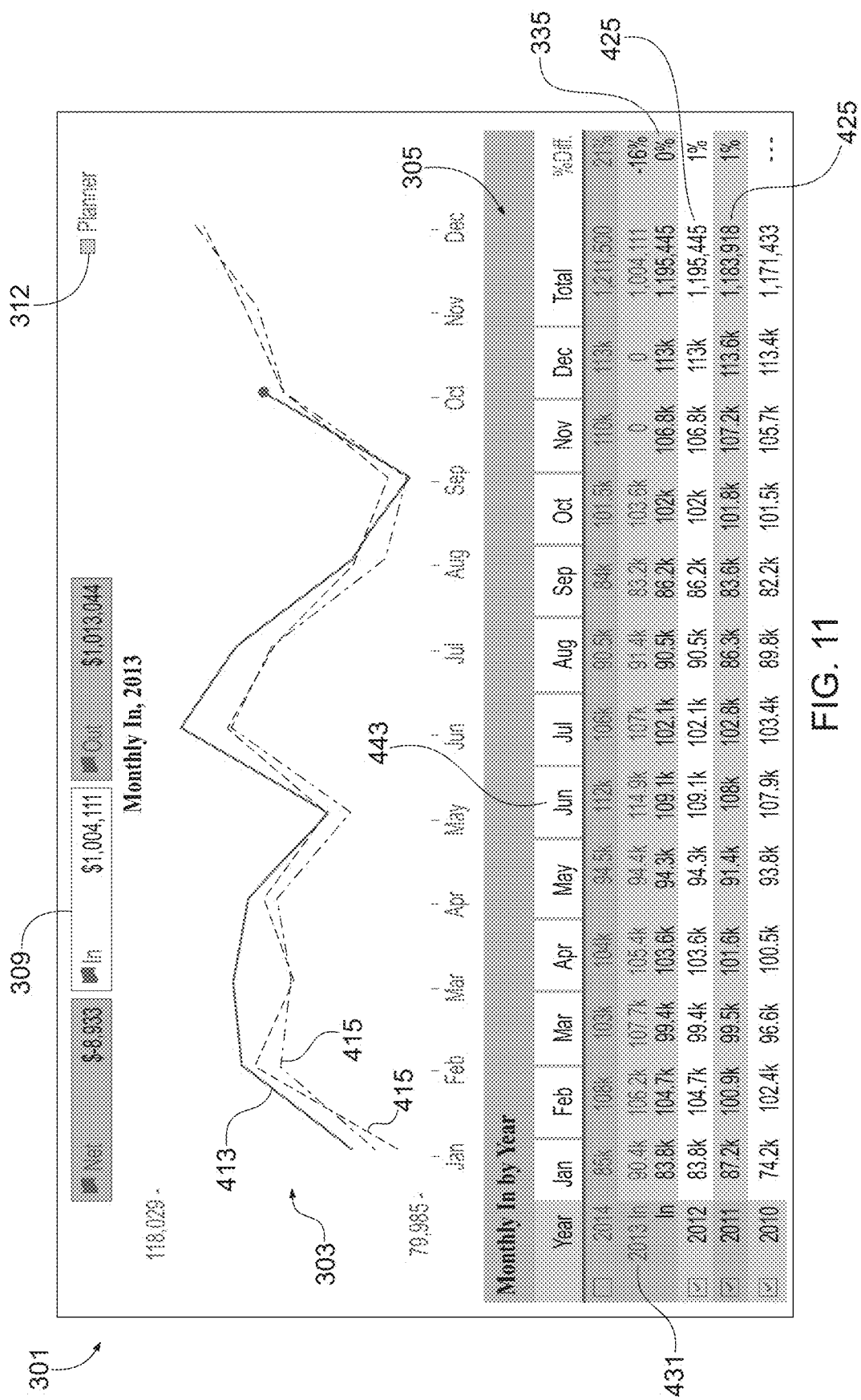
FIG. 11 illustrates a GUI of the present invention that is displayed when the Cash In UI element is selected and a planner toggle is deselected, in accordance with an exemplary embodiment of the present disclosure.

However, as illustrated by FIG. 5, when the planner toggle 312 is unchecked, no projected plan net line is displayed. FIG. 5 provides an example of when the planner toggle 312 is unchecked and Net tab 307 is selected. While the graphical section 303 still provides a graph 313 of the actual net amount 331, there is no projected plan net line. Furthermore, by unselecting the planner toggle 312, the graphs 315 of historical data may still be visible as these are dependent on the checkbox 327 in the spreadsheet section 305. Despite that the FIG. 5 shows the display with the Net tab 307 selected, the graphical section 303 would be displayed similarly if the planner toggle 312 is unchecked and the In tab 309 or the Out tab 311 is selected, as illustrated in FIGS. 11 and 14. With the planner toggle deselected, the projected plan cash in line and the projected plan cash out line are not displayed when a respective one of the In tab 309 or Out tab 311 is selected.

Net Tab Future Year

Figure 6:
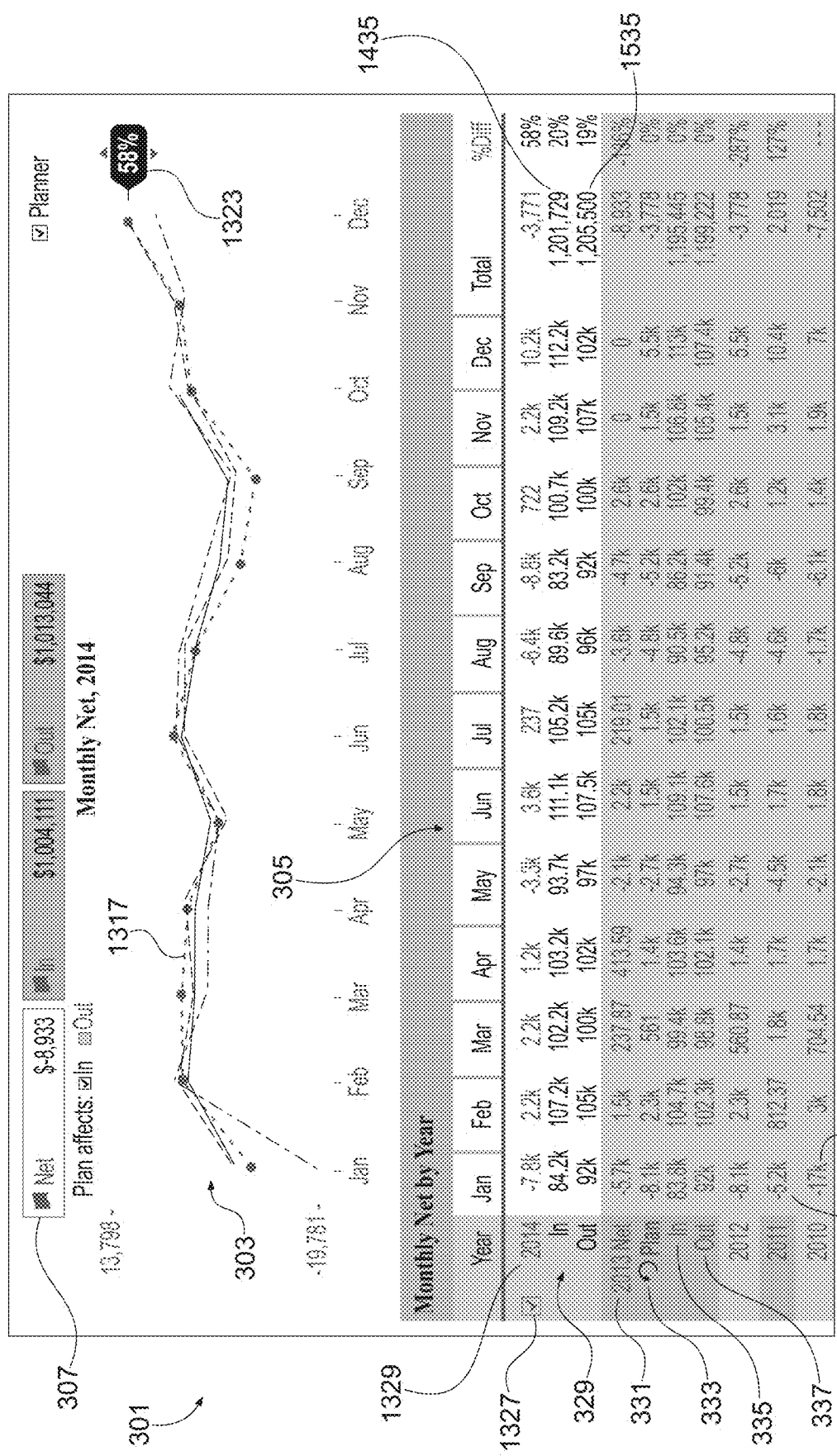
FIG. 6 illustrates a GUI of the present invention that is displayed when the Net UI element, the planner toggle, and a future year information UI element are selected, in accordance with an exemplary embodiment of the present disclosure.

As illustrated in the exemplary GUI of FIG. 6, the future year net information 1329, the can be displayed in the graph and spreadsheet at the beginning of the current calendar year in the row above the expanded current year data. In other embodiments, various combinations of this information may be displayed when the future year net amount box 1327 is checked. Checking the box 1327 for the future year net amount in the spreadsheet will display the future plan line 1317 in the graph section 303. For simplicity, when using the future year information 329 under the Net tab 307, the current and previous year rows 331, 333, 335, 337, and 325 in the spreadsheet section 305 may be grayed out. The graph of the current year actual net amount 313 and previous year 315 lines in the graph section 303 may be grayed out or may be shown as well.

Figure 12:
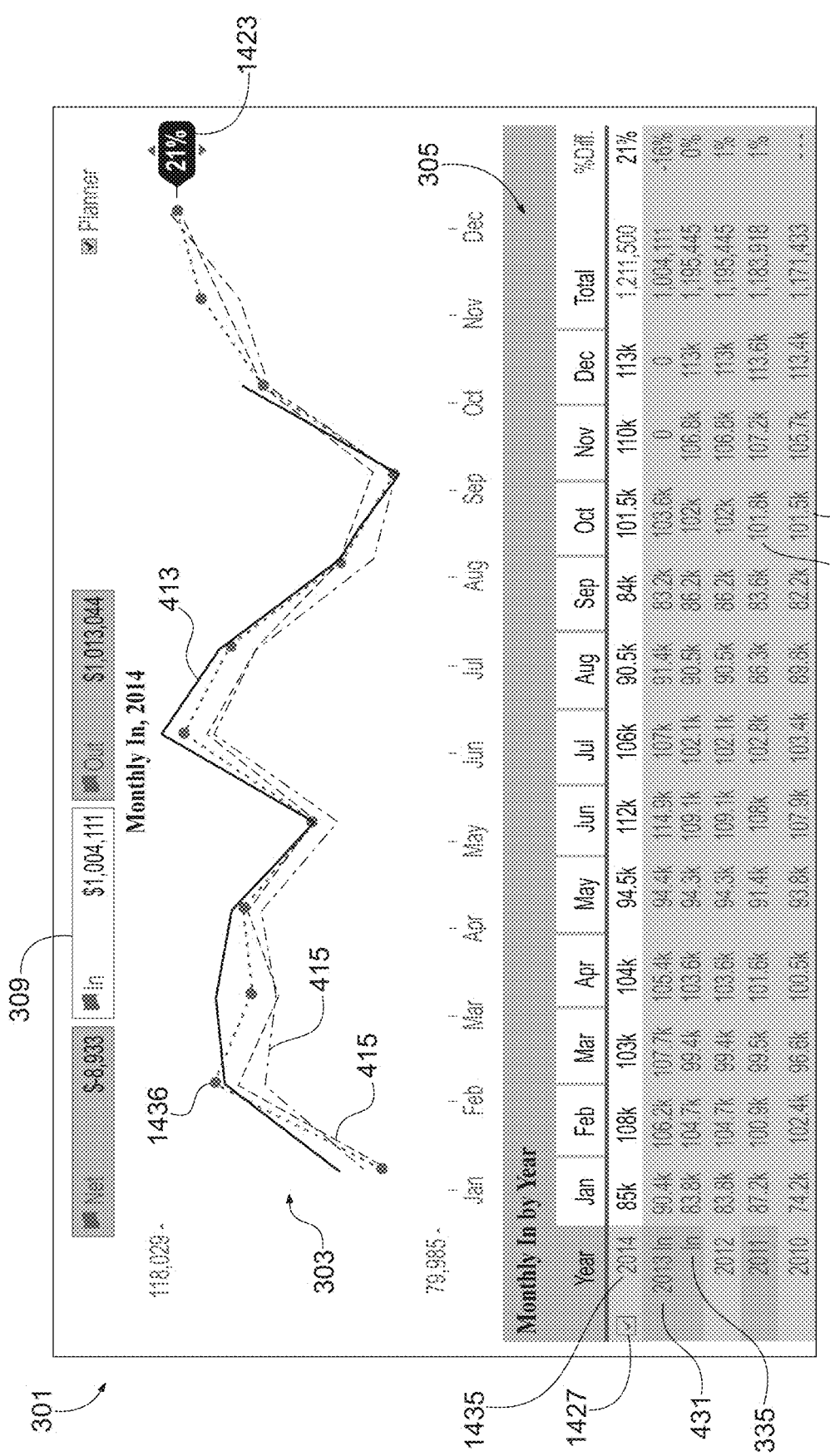
FIG. 12 illustrates a GUI of the present invention that is displayed when the Cash In UI element, the planner toggle, and a future year information UI element are selected, in accordance with an exemplary embodiment of the present disclosure.

As seen in FIG. 6, the future year information 329 from FIG. 3 is able to be expanded to show the future year net information 1329, the future year cash in 1435, and the future year cash out 1535. The default future values may be set to be equal to the current year actual values for net 331, cash in 431, and cash out 531 plus the planned values for net 333, cash in 335, and cash out 337, respectively. By selecting the In tab 309 or the Out tab 311 in combination with the associated future checkbox 1427 or 1527, a graph 1436 of the future year cash in 1435 or a graph 1536 of the future year cash out 1535 may be displayed, as shown in FIGS. 12 and 15, respectively.

According to embodiments, the same rules and effects apply with the future year net information 1329, the future year cash in 1435, and the future year cash out values 1535 as with the current year amounts; if changes are made in one instance for a value, the changes are updated for all instances of that value.

Furthermore, in displaying the data, the future year net information 1329, and similarly the future year cash in 1435 and the future year cash out values 1535, may be highlighted in a different color from current year or previous year data. Other restrictions may be placed on viewing the future year information 329. For example, if data from a previous year isn't available yet, the future year information 329 may not be populated or if all 12 months of a previous year are not entered in a plan, and the percent change handle 1323 for the future year net graph 1317 may not appear. In addition, if the future year net amount box 1327 is checked, the UI 301 may only allow edits of the future year net information 1329. This can be done via the future year net percent change handle 1323, by moving a point on the future year net graph 1317, or by editing the future year net information 1329 values in the spreadsheet section 305. A graph (not shown) of the future year cash in 1435 and future year cash out 1535 that would appear with the In tab 309 or the Out tab 311 may be modified in a similar fashion. In addition, a user may be prevented from editing current or previous years while editing future year information regardless of what tab is selected.

Incomplete Data

Figure 7:
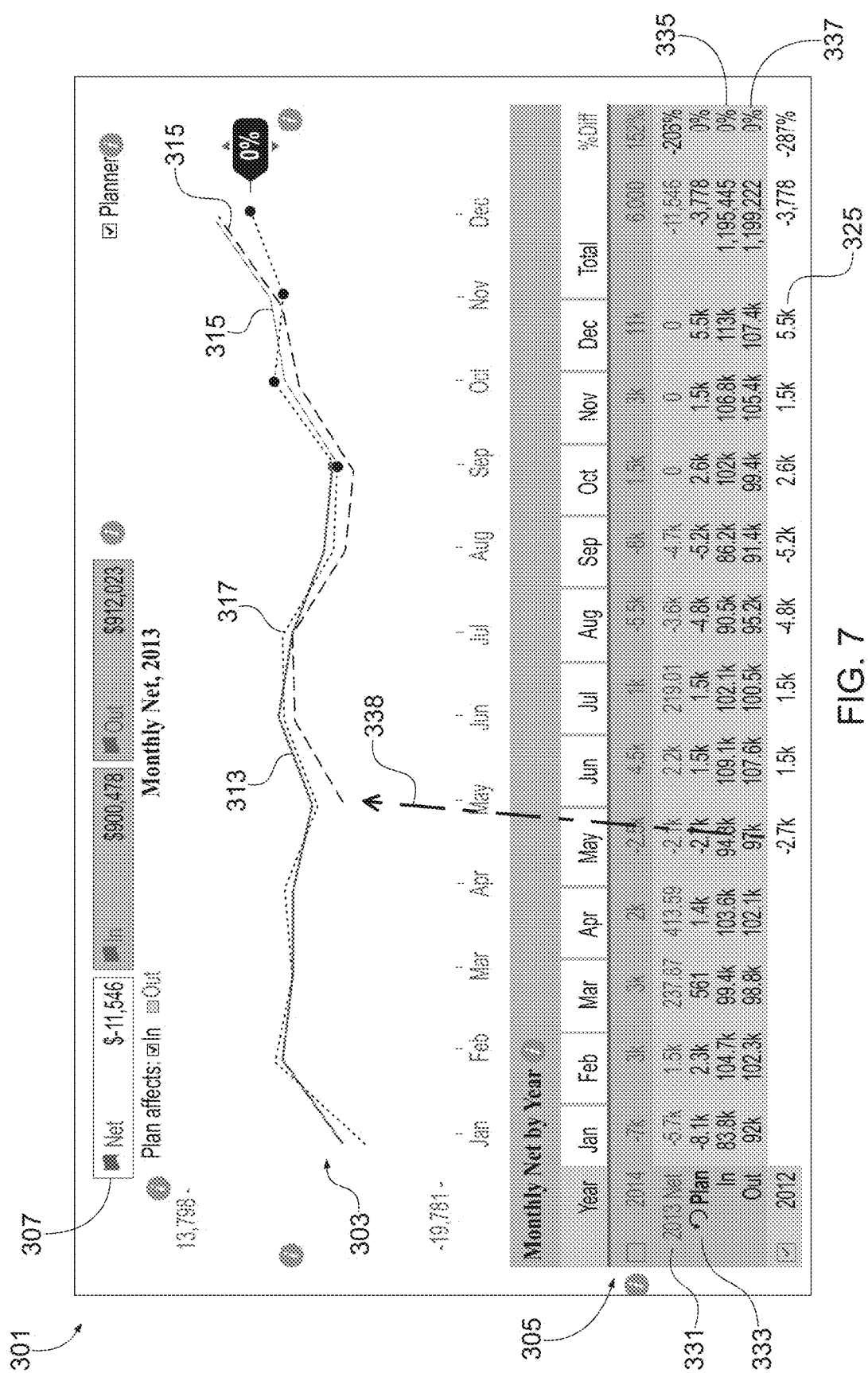
FIG. 7 illustrates a GUI of the present invention that is displayed when the Net UI element is selected and historical data is first provided, in accordance with the present disclosure.

Incomplete months or other time periods may be shown in the spreadsheet as empty boxes and may or may not be represented as a value on the graph. FIG. 7 provides an example of a new user with an account that only has historical data starting in May 2012. The Net tab 307 is selected and the graph 313 of actual net amount 331 is displayed as it would be otherwise. The first historical data is from May 2012 and this forms the point 338 for the graph 315 of the historical data for 2012. In another embodiment (not shown), the planned net amount 333, planned cash in 335, and planned cash out 337 amounts may begin based on user submitted data. The first point for the graphs of this information, may be the first date for which information is available. Incomplete data situations may occur for newer customers of the host institution whose past statement history is not complete. Incomplete data situations would be represented the same way in the case that the In tab 309 or Out tab 311, was selected.

Figure 8:
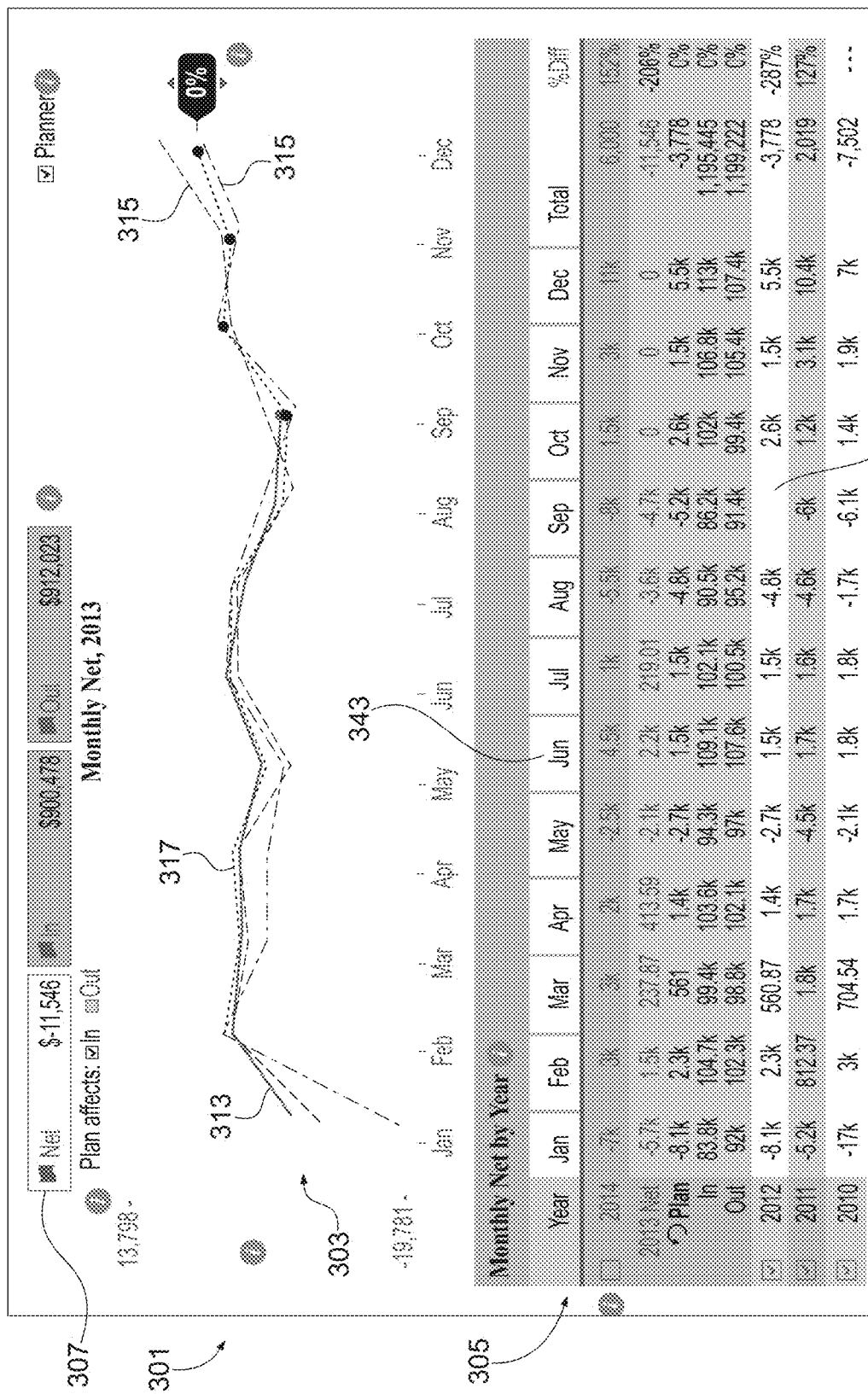
FIG. 8 illustrates a GUI of the present invention that is displayed when the Net UI element is selected and a portion of historical data is missing, in accordance with the present disclosure.
Figure 9:
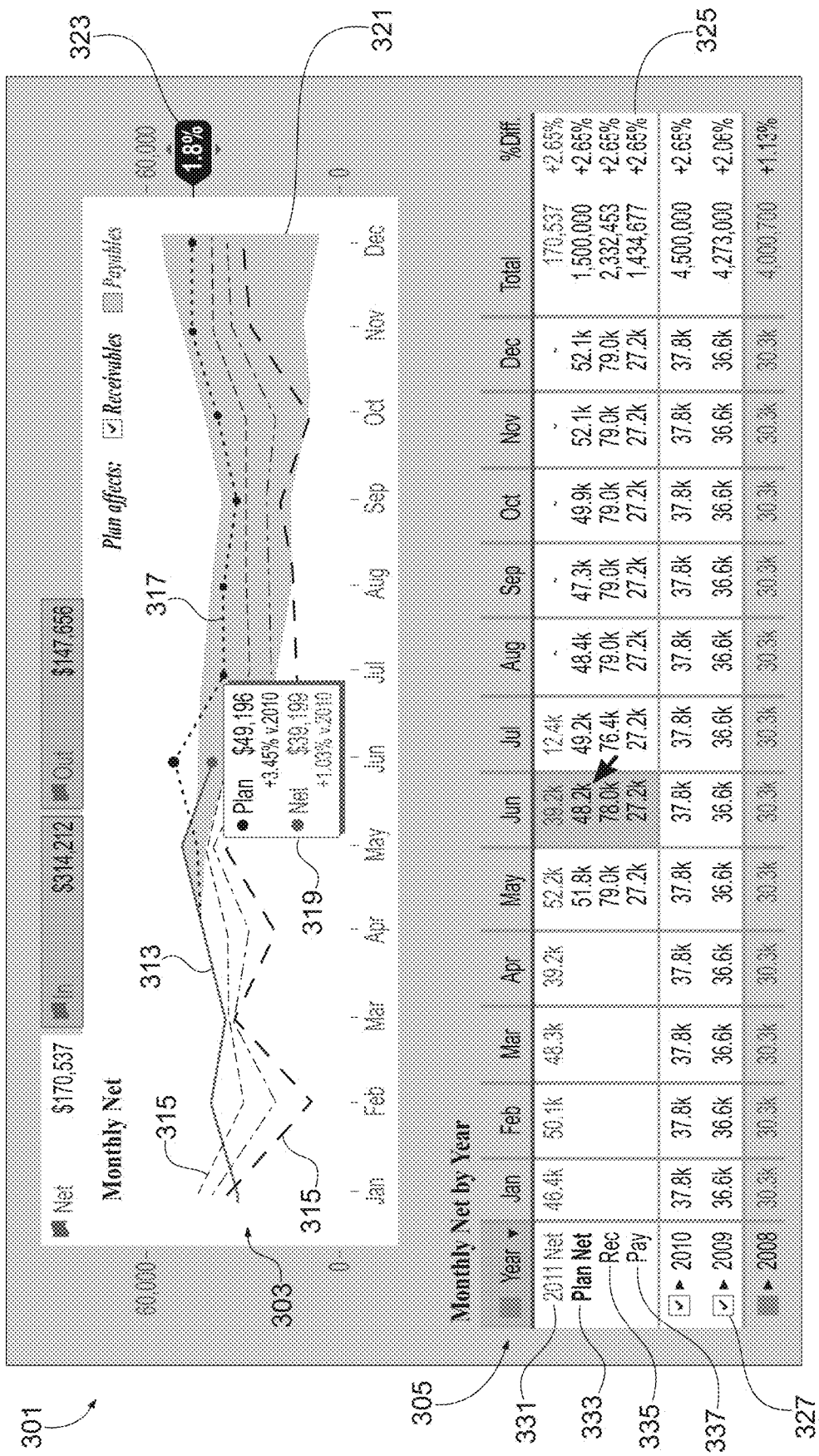
FIG. 9 illustrates a GUI of the present invention that is displayed when the Net UI element is selected and an embodiment of a jaggedy wedge is shown in accordance with an exemplary embodiment of the present disclosure.

In addition, as shown in FIG. 8, the incomplete month 340 is shown as an empty box and the graph line 315 for that time period, the year 2012 as shown in FIG. 8, may connect between months where there is historical data. This information would be represented the same way in the case that the In tab 309 or the Out tab 311 was selected.

Net Jaggedy Wedge

Further, as shown in the exemplary embodiment of FIG. 9, navigating to and hovering over a portion of the graph 313 (i.e., hovering using an input device), or by a separate selection of a user, the Net Jaggedy Wedge 321 may be displayed. The Net Jaggedy Wedge is so named since it provides a best and worst case net amount scenario. The best and worst case net amount scenario may relate to the historical net amount information and may started at the beginning of a year, the first month for which a planned value is shown, or chosen arbitrarily as in FIG. 9. While FIG. 9 shows the Net Jaggedy Wedge 321, a Jaggedy Wedge embodiment may be shown with all the same attributes and functions for cash in values or cash out values if the In tab 309 or Out tab 311 is selected.

As discussed, a Jaggedy Wedge displays to a user the best and worst case cash flow scenarios that may be based on past performance. The range of values displayed by the Jaggedy Wedge may also be based on a suggested projection using predetermined algorithms as a percent variation both positive and negative. Thus, the Jaggedy Wedge may be used to represent a predetermined increase and/or decrease over a default plan line by a percentage or straight amount. For example, the Net Jaggedy Wedge 321 is shown in FIG. 9 and may be calculated to represent a 1% increase and 1% decrease over the lowest and highest historical amounts 325, for examples as those shown by the graphs 315.

Moreover, the representation of the Jaggedy Wedge may depend on an algorithm. The algorithms of the Jaggedy Wedge may be based off of host information, such as account information provided by a financial service provider such as a bank. The algorithm for the Jaggedy Wedge may also work off of each business's cyclical trend and recent transactions. In addition, the Jaggedy Wedge can be based on a profile for the account that is represented in the UI 301, profiles for the providers behind the cash in and/or cash out input values, and/or industry trends.

A user can also select or deselect historical data by checking the appropriate checkbox 327 in the spreadsheet 305 that correspond to that year's data, thus removing that year from the Jaggedy Wedge calculation. With no previous history displayed, the Jaggedy Wedge will display based on the information shown in the spreadsheet section 305 depending on the selected UI element, which is shown as tabs 307, 309, and 311. The Jaggedy Wedge for each of the net amount information, the cash in information, and the cash out information may also be displayed in a different UI element such as in an additional, separate tab. In addition, a Future Jaggedy Wedge (not shown) may also be available for display of any future year net, cash in, or cash out information, when the future year information 329, future year net information 1329, future year cash in 1435, or future year cash out 1535 is selected. This may be subject to the same algorithm and estimation procedures as used for the Jaggedy Wedge that appears with the Net 307, In 309, and Out 311 tabs when the future year net amount box 1327 is not checked.

In Tab

As discussed above, in the non-limiting examples shown in FIGS. 10-12, when the In tab 309 is selected, the graph representation 413 illustrates only actual cash in values 431 for each month of the current year represented by the columns in the spreadsheet section 305 that have complete data. As with the graph 313 discussed above, the most recent month with complete data 443 may be shown by a bold dot or other way of emphasis. Similar to FIGS. 3, 5, and 7-9, historical data 425 in the spreadsheet section 305 is shown by graphs 415 when the associated checkbox 427 is marked.

Additionally, in FIG. 10 the projected plan cash in line 417 that charts the planned cash in values 335 is also displayed and can be adjusted as described above when the planner toggle 312 is checked. Also as described above, by adjusting the percent change handle 423 the projected plan cash in line 417 can be changed. In addition, a Cash In Jaggedy Wedge feature similar to that shown in FIG. 9, may also be displayed. As discussed, this may provide an easy visualization of a 1% increase and 1% decrease over the highest and lowest graphs of the historical values 415, respectively.

FIG. 11 provides an exemplary illustration of the graph section 303 and spreadsheet section 305 when the In tab 309 is selected and the planner toggle 312 is not selected. It should also be noted that the appearance of a pop up box, as discussed above, may change dependent upon whether the planner toggle 312 is checked.

FIG. 12 provides an exemplary illustration of the graph section 303 and spreadsheet section 305 when the In tab 309 is selected, the planner toggle 312 is selected, and the future year cash in checkbox 1427 is selected. A graph 1436 of future year cash in values 1435 is displayed. The graph 1436 and associated values 1435 may be edited similar to the embodiments of above, including based on the future year cash in percent change handle 1423. As shown in FIG. 12, when the future year checkbox is selected, the historical and current information may be greyed out such that it is not selectable while the graphs 415 of historical years and graph 413 of current year cash in values my still be visible. However, in other preferred embodiments the historical and current year, along with planned cash in, information may also be displayed and/or be selectable while the future year cash in checkbox 1427 is selected.

Out Tab

In similar examples to FIGS. 10-12, FIGS. 13-15 provide non-limiting examples demonstrating GUIs of the present invention when Out tab 311 is selected. The graph 513 that illustrates only cash out amounts 531 for each month of the current year represented by the columns in the spreadsheet section 305 that have complete data. Similar to FIGS. 3, 5, and 7-9, historical data 525 in the spreadsheet section 305 is shown by graphs 515 when the associated checkbox 527 is marked.

Additionally, FIG. 13 shows one embodiment of the projected plan cash out line 517 that charts the planned cash out 337. The projected plan cash out line 517 can be adjusted as described above when the planner toggle 312 is checked. As described, by adjusting the percent change handle 523 the projected plan cash out line 517 can be changed based on the value of the percent change handle 523. In addition, a Cash Out Jaggedy Wedge feature similar to that shown in FIG. 9, may also displayed. As discussed, this may provide an easy visualization of a 1% increase and 1% decrease over the highest and lowest graphs of the historical values 515, respectively.

FIG. 14 provides an exemplary illustration of the graph section 303 and spreadsheet section 305 when the Out tab 311 is selected and the planner toggle 312 is not marked. It should also be noted that the appearance of a pop up box, as discussed above, may change dependent upon whether the planner toggle 312 is checked.

FIG. 15 provides an exemplary illustration of the graph section 303 and spreadsheet section 305 when the Out tab 311 is selected, the planner toggle 312 is selected, and the future year cash out checkbox 1527 is selected. A graph 1536 of future year cash out values 1535 is displayed. The graph 1536 and associated future year cash out values 1535 may be edited similar to the embodiments of above, including based on the future year cash out percent change handle 1523. As shown in FIG. 15, when the future year checkbox is selected, the historical and current information may be greyed out such that it is not selectable while the graphs 515 of historical years and graph 513 of current year cash in values my still be visible. However, in other preferred embodiments the historical and current year, along with planned cash in, information may also be displayed and/or be selectable while the future year cash out checkbox 1527 is selected.

Categories

As shown in FIG. 16, the data displayed in the spreadsheet section 305 of the Out (as shown "Payables") tab 311 may be broken down into categories 561 listed for a specified year. Additionally, the graph section 303 may also display the categories as level in a graphical representation as shown in FIG. 16. A pop up box 519, similar to that described above, may be provided and display information based on highlighting of a particular month and category. In the example of FIG. 16, the pop up box 519 displays the May 2011 Contractor fees and an percentage of what those fees are above previous year 2010 for the same month.

The category breakdown view may be selected, for example, via a dropdown view menu 565 and a year that may be selected, for example, via a dropdown year menu 563, as well. The breakdown of the categories may be provided by the host institution or may be provided by a user. The categories 561 may specific to a particular industry or general business breakdowns such as, as shown in the example of FIG. 16, automotive, contractor, equipment, rent/utilities, and supplies. The actual cash out 531 and planned cash out 337 are also shown in FIG. 16.

The breakdown for categories may be similarly applied to both the Net and In tabs 307, 309 and for future year information associated with any of the Net, In, or Out tabs 307, 309, 311. Furthermore, for each tab 307, 309, 311, the values for the actual net amount, actual cash in, and actual cash out may depend on the posted balance, available balance, or pending balance of each category based on the choice of the host institution or the user.

Example Computer System Implementation

Embodiments of the present disclosure also may be directed to computer program products comprising software stored on any computer useable medium. Such software, when executed in one or more data processing device, causes a data processing device(s) to operate as described herein. Embodiments of the present disclosure employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

Accordingly, it will be appreciated that one or more embodiments of the present disclosure can include a computer program comprising computer program code means adapted to perform one or all of the steps of any methods or claims set forth herein when such program is run on a computer, and that such program may be embodied on a computer readable medium. Further, one or more embodiments of the present disclosure can include a computer comprising code adapted to cause the computer to carry out one or more steps of methods or claims set forth herein, together with one or more apparatus elements or features as depicted and described herein.

As would be appreciated by someone skilled in the relevant art(s) and described below with reference to FIG. 17, part or all of one or more aspects of the methods and systems discussed herein may be distributed as an article of manufacture that itself comprises a computer readable medium having computer readable code means embodied thereon.

The computer readable program code means is operable, in conjunction with a computer system, to carry out all or some of the steps to perform the methods or create the apparatuses discussed herein. The computer readable medium may be a recordable medium (e.g., hard drives, compact disks, EEPROMs, or memory cards). Any tangible medium known or developed that can store information suitable for use with a computer system may be used. The computer-readable code means is any mechanism for allowing a computer to read instructions and data, such as magnetic variations on a magnetic media or optical characteristic variations on the surface of a compact disk. The medium can be distributed on multiple physical devices (or over multiple networks). For example, one device could be a physical memory media associated with a terminal and another device could be a physical memory media associated with a processing center.

The computer systems and servers described herein each contain a memory that will configure associated processors to implement the methods, steps, and functions disclosed herein. Such methods, steps, and functions can be carried out, e.g., by processing capability on mobile device, POS terminal, payment processor, acquirer, issuer, or by any combination of the foregoing. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor.

Aspects of the present disclosure shown in FIGS. 1-16, or any part(s) or function(s) thereof, may be implemented using hardware, software modules, firmware, tangible computer readable media having instructions stored thereon, or a combination thereof and may be implemented in one or more computer systems or other processing systems.

Figure 17:
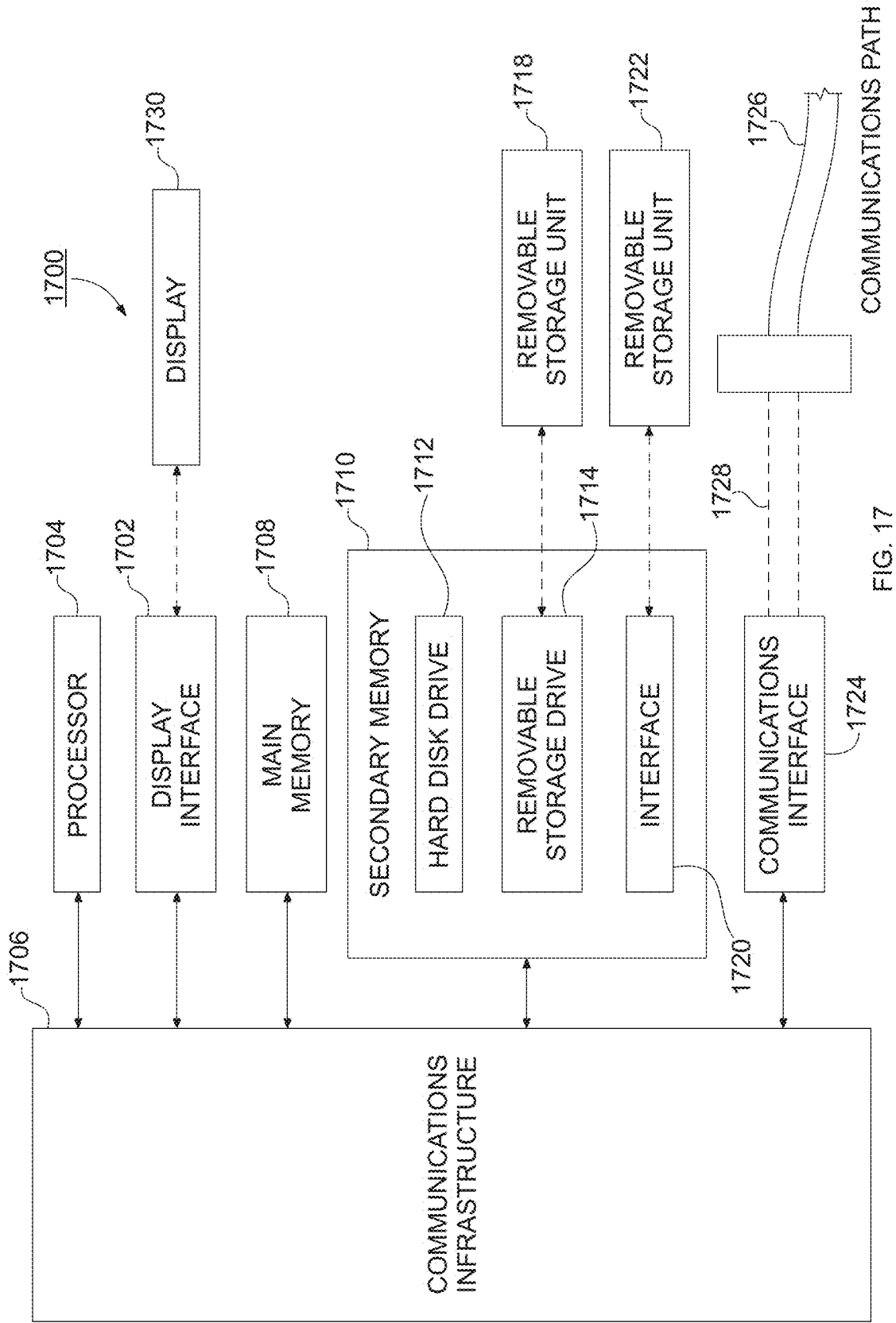
FIG. 17 depicts an example computer system in which embodiments of the present invention may be implemented.

FIG. 17 illustrates an example computer system 1700 in which embodiments of the present disclosure, or portions thereof, may be implemented as computer-readable code. For example, the various aspects of the User Interface depicted in FIGS. 3-16 can be implemented in computer system 1700 using hardware, software, firmware, non-transitory computer readable media having instructions stored thereon, or a combination thereof and may be implemented in one or more computer systems or other processing systems. Hardware, software, or any combination of such may embody any of the modules and components used to implement the network architecture 100 of FIG. 1, the system 200 of FIG. 2, methods described above, and the user interfaces described above with reference to FIGS. 3-16.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments. A processor device may be a single processor, a plurality of processors, or combinations thereof. Processor devices may have one or more processor "cores."

Various embodiments of the present disclosure are described in terms of this example computer system 1700. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

The processor device 1704 may be a special purpose or a general purpose processor device. As will be appreciated by persons skilled in the relevant art, processor device 1704 may also be a single processor in a multi-core/multiprocessor system, such system operating alone, or in a cluster of computing devices operating in a cluster or server farm. Processor device 1704 is connected to a communication infrastructure 1706, for example, a bus, message queue, network, or multi-core message-passing scheme.

The computer system 1700 also includes a main memory 1708, for example, random access memory ("RAM"), and may also include a secondary memory 1710. Secondary memory 1710 may include, for example, a hard disk drive 1712, removable storage drive 1714. Removable storage drive 1714 may comprise a floppy disk drive, a magnetic tape drive, an optical disk drive, a flash memory, or the like.

The removable storage drive 1714 may read from and/or writes to a removable storage unit 1718 in a well-known manner. The removable storage unit 1718 may comprise a floppy disk, magnetic tape, optical disk, Universal Serial Bus ("USB") drive, flash drive, memory stick, etc. which is read by and written to by removable storage drive 1714. As will be appreciated by persons skilled in the relevant art, the removable storage unit 1718 includes a non-transitory computer usable storage medium having stored therein computer software and/or data.

In alternative implementations, the secondary memory 1710 may include other similar means for allowing computer programs or other instructions to be loaded into computer system 1700. Such means may include, for example, a removable storage unit 1722 and an interface 1720. Examples of such means may include a program cartridge and cartridge interface (such as that found in video game devices), a removable memory chip (such as an EPROM, or PROM) and associated socket, and other removable storage units 1722 and interfaces 1720 which allow software and data to be transferred from the removable storage unit 1722 to computer system 1700.

The computer system 1700 may also include a communications interface 1724. The communications interface 1724 allows software and data to be transferred between the computer system 1700 and external devices. The communications interface 1724 may include a modem, a network interface (such as an Ethernet card), a communications port, a PCMCIA slot and card, or the like. Software and data transferred via the communications interface 1724 may be in the form of signals, which may be electronic, electromagnetic, optical, or other signals capable of being received by communications interface 1724. These signals may be provided to the communications interface 1724 via a communications path 1726. The communications path 1726 carries signals and may be implemented using wire or cable, fiber optics, a phone line, a cellular/wireless phone link, an RF link or other communications channels.

In this document, the terms "computer program medium", "non-transitory computer readable medium", and "computer usable medium", are used to generally refer to tangible media such as removable storage unit 1718, removable storage unit 1722, and a hard disk installed in hard disk drive 1712. Signals carried over the communications path 1726 can also embody the logic described herein. The computer program medium and computer usable medium can also refer to memories, such as main memory 1408 and secondary memory 1710, which can be memory semiconductors (e.g. DRAMs, etc.). These computer program products are means for providing software to computer system 1700.

Computer programs (also called computer control logic and software) are generally stored in a main memory 1708 and/or secondary memory 1710. The computer programs may also be received via a communications interface 1724. Such computer programs, when executed, enable computer system 1700 to become a specific purpose computer able to implement the present disclosure as discussed herein. In particular, the computer programs, when executed, enable the processor device 1704 to implement the processes of the present disclosure discussed below. Accordingly, such computer programs represent controllers of the computer system 1700. Where the present disclosure is implemented using software, the software may be stored in a computer program product and loaded into the computer system 1700 using the removable storage drive 1714, interface 1720, and hard disk drive 1712, or communications interface 1724.

CONCLUSION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Although the invention is illustrated and described herein with reference to specific embodiments, the invention is not intended to be limited to the details shown. Rather, various modifications may be made in the details within the scope and range equivalents of the claims and without departing from the invention.

We claim:

1. A system for financial planning based on an actual cash position, the system comprising:
    a processor in operative communication with a first transaction server to process cash in transactions and a second transaction server to process cash out transactions, wherein at least one of the cash in transaction and cash out transactions are obtained from an account that is linked to the system, the processor and the account being controlled by a host institution; and
    a non-transitory computer-readable medium having instructions stored thereon, that, if executed by the processor, cause the processor to render a graphical user interface ("GUI") on a display, the GUI comprising a plurality of selectable user interface ("UP") elements, the instructions comprising:
        instructions for displaying at least one of net amount information of the actual cash position and a net amount graph in response to receiving a selection of a first UI element of the plurality of selectable UI elements, the net amount information being actual cash out amount information for an entity subtracted from actual cash in amount information for the entity;
        instructions for displaying at least one of the actual cash in amount information and an actual cash in amount graph in response to receiving a selection of a second UI element of the plurality of selectable UI elements; and
        instructions for displaying at least one of the actual cash out amount information and an actual cash out amount graph in response to receiving a selection of a third UI element of the plurality of selectable UI elements;
        wherein at least one of the first UI element and a fourth UI element is operable to display at least one of planned net amount information and a planned net amount graph, the planned net amount information being planned cash out amount information subtracted from planned cash in amount information;
        wherein at least one of the second UI element and a fifth UI element is operable to display at least one of planned cash in amount information and a planned cash in amount graph;
        wherein at least one of the third UI element and a sixth UI element is operable to display at least one of planned cash out amount information and a planned cash out amount graph;
        wherein the GUI comprises a cash flow net amount scenario display, the cash flow net amount scenario display being displayed along with the net amount information display and/or the planned net amount display, the cash flow net amount scenario display comprising:
            a first graphical representation of at least one of the net amount, the actual cash out amount, the actual cash in amount, the planned net amount, the planned cash out amount, and the planned cash in amount;
            a second graphical representation comprising a variation, both positive and negative, about the first graphical representation, the variation based at least in part on actual historical data and a business cyclical trend;
            wherein the variation is modifiable via selection and de-selection of a year representative of actual historical data for that year, wherein a range of values displayed within the variation is based on a range input by a user; and
        wherein the GUI comprises a spreadsheet section that details historical, current, and possible future activity and is displayed adjacent the net amount graph and/or the planned net amount graph, wherein items within the spreadsheet section are sortable.

2. The system of claim 1, wherein the actual cash position is an actual cash position of an entity; and
    wherein the net amount information is based on a current time value; and
    the instructions further comprising:
        instructions for displaying historical net amount information and a historical net amount graph; and
        wherein the historical net amount information is based on a historical time value.

3. The system of claim 2, wherein the current time value is a current year and the historical time value is a year prior to the current year.

4. The system of claim 2, wherein the GUI is configured to accept a selection of future net amount information based on a future time value, the instructions further comprising:
    instructions for displaying at least one of the future net amount information and a future net amount graph in response to receiving the selection of the future net amount information.

5. The system of claim 4, wherein the current time value is a current year and the future time value is a year succeeding the current year.

6. The system of claim 1, wherein the cash flow net amount scenario is based on the historical net amount information.

7. The system of claim 1, the instructions further comprising:
    instructions for causing the GUI to simultaneously display an individual planned net amount graph, an individual planned cash in amount graph, and an individual planned cash out amount graph for each user of a plurality of users.

8. The system of claim 7, wherein the host institution is a bank and the processor is controlled by the bank.

9. The system of claim 1, wherein the second UI element is a second tab and the third UI element is a third tab, the instructions further comprising:

instructions for displaying at least one of historical cash in amount information based on a historical time value and a historical cash in amount graph; and instructions for displaying at least one of historical cash out amount information based on the historical time value and a historical cash out amount graph.

10. The system of claim 1, wherein the planned net amount information and the planned net amount graph are adjustable based on inputs received from a user, the instructions further comprising:

instructions for updating the planned net amount information and displaying an updated planned net amount graph in response to receiving adjustments to at least one of the planned net amount information and the planned net amount graph.

11. The system of claim 1, wherein at least one of the planned cash in amount information and the planned cash in amount graph are adjustable based on inputs received from a user, the instructions further comprising:

instructions for updating the planned cash in amount information and displaying an updated planned cash in amount graph in response to receiving adjustments to at least one of the planned cash in amount information and the planned cash in amount graph.

12. The system of claim 1, wherein the planned cash out amount information and the planned cash out amount graph are adjustable based on inputs received from a user, the instructions further comprising:

instructions for updating the planned cash out amount information and displaying an updated planned cash out amount graph in response to receiving adjustments to at least one of the planned cash out amount graph cause and the planned cash out amount information.

13. The system of claim 1, wherein the plurality of UI elements of the GUI comprises a planner toggle, the instructions further comprising:

instructions for displaying the planned net amount graph if the planner toggle is selected; and instructions for foregoing displaying the planned net amount graph if the planner toggle is not selected.

14. The system of claim 1, wherein the GUI comprises a selectable cash in UI element and a selectable cash out UI element, the instructions further comprising:

instructions for updating the planned cash in amount information and displaying the updated planned cash in amount graph in response to receiving at least one of a selection of the selectable cash in UI element, adjustments to the planned net amount information, and adjustments to the planned cash in amount graph; and instructions for updating the planned cash out amount information and displaying the updated planned cash out amount graph in response to receiving at least one of a selection of the selectable cash out UI element, adjustments to the planned net amount information, and adjustments to the planned cash out amount graph.

15. The system of claim 1, the instructions further comprising:

instructions for displaying a pop up box at a point on the net amount graph or the planned net amount graph in response to user interaction with the GUI.

16. The system of claim 1, wherein the net amount graph and/or the planned net amount graph displays, within a graphical section, categories of cash in transactions and/or cash out transactions graphically represented as levels.

17. A non-transitory computer readable medium having instructions stored thereon that, if executed by a computing device, cause the computing device to perform operations for providing a tool for financial planning based on an actual cash position of an entity, the operations comprising:

executing an application on application server to facilitate transmission, identification, and authentication of materials between the computer device and a host system, the application further facilitating opening an account by a user of the computer device from a remote location of a user of the host system;

rendering a graphical user interface ("GUI") having a plurality of selectable user interface ("UP") elements;

in response to detecting a selection of a first UI element of the plurality of UI elements, displaying at least one of a net amount of the actual cash position and a net amount graph, the net amount of the actual cash position being an actual cash in amount subtracted by an actual cash out amount;

in response to detecting a selection of a second UI element of the plurality of UI elements, displaying at least one of the actual cash in amount and an actual cash in amount graph; and in response to detecting a selection of a third UI element of the plurality of UI elements, displaying at least one of the actual cash out amount and an actual cash out amount graph;

wherein at least one of the first UI element and a fourth UI element is operable to display at least one of a planned net amount and a planned net amount graph;

wherein at least one of the second UI element and a fifth UI element is operable to display a planned cash in amount and a planned cash in amount graph;

wherein at least one of the third UI element and a sixth UI element is operable to display at least one of a planned cash out amount and a planned cash out amount graph;

wherein rendering the GUI further comprises displaying a graphical representation of a default plan line along with a predetermined increase and/or decrease about the default plan line, the predetermined increase and/or decrease based at least in part on actual historical data and a business cyclical trend, wherein the predetermined increase and/or decrease in the graphical representation is modifiable via selection and de-selection of a year representative of actual historical data for that year, wherein a range of values displayed within the predetermined increase and/or decrease of the graph is based on a range input by a user; and displaying a spreadsheet section that details historical, current, and possible future activity adjacent the net amount graph and/or the planned net amount graph, wherein items within the spreadsheet section are sortable.

18. The non-transitory computer readable medium of claim 17, wherein the net amount graph and/or the planned net amount graph displays, within a graphical section, categories of cash in transactions and/or cash out transactions graphically represented as levels.

19. A method for financial planning based on an actual cash position, the method comprising:

executing an application to facilitate transmission, identification, and authentication of materials between a client user and a host user, the application further facilitating opening an account by the client user from a remote location of the host user;

rendering a graphical user interface ("GUI") for a financial planning tool, the GUI comprising a plurality of selectable user interface ("UI") elements;

presenting, in the GUI, at least one of net amount information of the actual cash position and a net amount graph in response to receiving a selection of a first UI element of the plurality of selectable UI elements, the net amount information being actual cash out amount information for an entity subtracted from actual cash in amount information for the entity;

displaying at least one of the actual cash in amount information and an actual cash in amount graph in response to receiving a selection of a second UI element of the plurality of selectable UI elements;

displaying at least one of the actual cash out amount information and an actual cash out amount graph in response to receiving a selection of a third UI element of the plurality of selectable UI elements;

wherein:
- at least one of the first UI element and a fourth UI element is operable to display at least one of planned net amount information and a planned net amount graph, the planned net amount information being planned cash out amount information subtracted from planned cash in amount information;
- at least one of the second UI element and a fifth UI element is operable to display at least one of planned cash in amount information and a planned cash in amount graph; and
- at least one of the third UI element and a sixth UI element is operable to display planned cash out amount information and a planned cash out amount graph;
- a spreadsheet section is presented in the GUI that details historical, current, and possible future activity and is displayed adjacent the net amount graph and/or the planned net amount graph, wherein the items within the spreadsheet section are sortable, and displaying a graphical representation of a default plan line along with a predetermined increase and/or decrease about the default plan line, the predetermined increase and/or decrease based at least in part on actual historical data and a business cyclical trend, wherein the predetermined increase and/or decrease in the graphical representation is modifiable via selection and de-selection of a year representative of actual historical data for that year, wherein a range of values displayed within the predetermined increase and/or decrease of the graph is based on a range input by a user.

20. The method of claim 19 wherein the actual cash position is an actual cash position of the entity; and
   wherein the plurality of selectable UI elements comprise a plurality of tabs.

21. The method of claim 20 wherein the net amount information is based on a current time value;
   the method further comprising:
   displaying at least one of historical net amount information and a historical net amount graph; and
   wherein the historical net amount information is based on a historical time value.

22. The method of claim 20, the method further comprising:
   displaying at least one of historical cash in amount information based on a historical time value and a historical cash in amount graph; and
   displaying at least one of historical cash out amount information based on the historical time value and a historical cash out amount graph.

23. The method of claim 19, wherein the net amount graph and/or the planned net amount graph displays, within a graphical section, categories of cash in transactions and/or cash out transactions graphically represented as levels.

\* \* \* \* \*